United States Patent
Davies et al.

(10) Patent No.: US 10,956,811 B2
(45) Date of Patent: Mar. 23, 2021

(54) VARIABLE EPOCH SPIKE TRAIN FILTERING

(71) Applicant: Intel Corporation, Santa Clara, CA (US)

(72) Inventors: Michael I. Davies, Portland, OR (US); Tsung-Han Lin, Campbell, CA (US)

(73) Assignee: Intel Corporation, Santa Clara, CA (US)

(*) Notice: Subject to any disclaimer, the term of this patent is extended or adjusted under 35 U.S.C. 154(b) by 873 days.

(21) Appl. No.: 15/664,614

(22) Filed: Jul. 31, 2017

(65) Prior Publication Data

US 2019/0034782 A1    Jan. 31, 2019

(51) Int. Cl.
    *G06N 3/04*     (2006.01)
    *G06N 3/063*    (2006.01)
    *G06N 3/08*     (2006.01)

(52) U.S. Cl.
    CPC ............ *G06N 3/049* (2013.01); *G06N 3/063* (2013.01); *G06N 3/08* (2013.01); *G06N 3/088* (2013.01)

(58) Field of Classification Search
None
See application file for complete search history.

(56) References Cited

U.S. PATENT DOCUMENTS

| 7,627,540 B2* | 12/2009 | Snook | G06F 15/7867 706/15 |
| 2018/0174040 A1* | 6/2018 | Davies | G06N 3/049 |

OTHER PUBLICATIONS

Davis, Michael I, "Computationally-Efficient Spike Train Filtering", U.S. Appl. No. 15/385,170, filed Dec. 20, 2016, 45 pgs.
Davis, Michael I, "Scalable Neuromorphic Core With Shared Synaptic Memory and Variable Precision Synaptic Memory", U.S. Appl. No. 15/385,026, filed Dec. 20, 2016, 78 pgs.
Davis, Michael I, et al., "Traced-Based Neuromorphic Architecture for Advance Learning", U.S. Appl. No. 15/385,219, filed Dec. 20, 2016, 57 pgs.

* cited by examiner

*Primary Examiner* — Alan Chen
(74) *Attorney, Agent, or Firm* — Schwegman Lundberg & Woessner, P.A.

(57) ABSTRACT

System and techniques for variable epoch spike train filtering are described herein. A spike trace storage may be initiated for an epoch. Here, the spike trace storage is included in a neural unit of neuromorphic hardware. Multiple spikes may be received at the neural unit during the epoch. The spike trace storage may be incremented for each of the multiple spikes to produce a count of received spikes. An epoch learning event may be obtained and a spike trace may be produced in response to the epoch learning event using the count of received spikes in the spike trace storage. Network parameters of the neural unit may be modified using the spike trace.

25 Claims, 17 Drawing Sheets

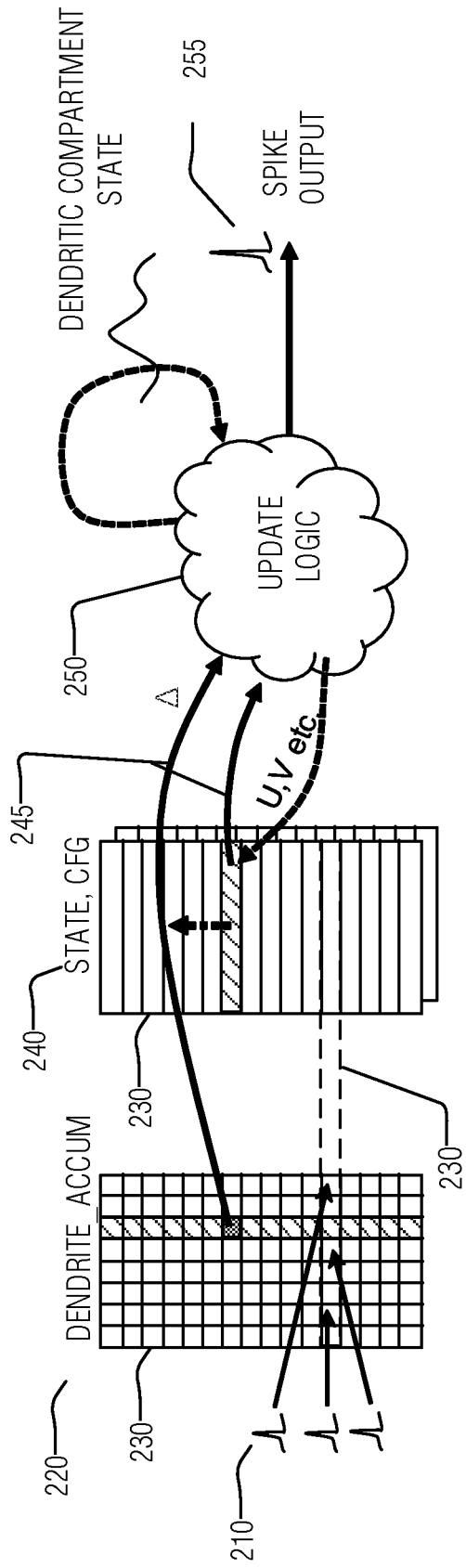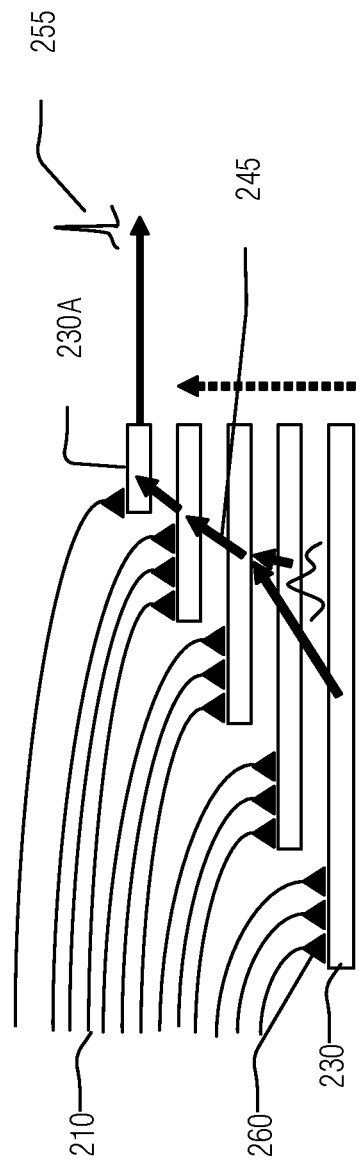

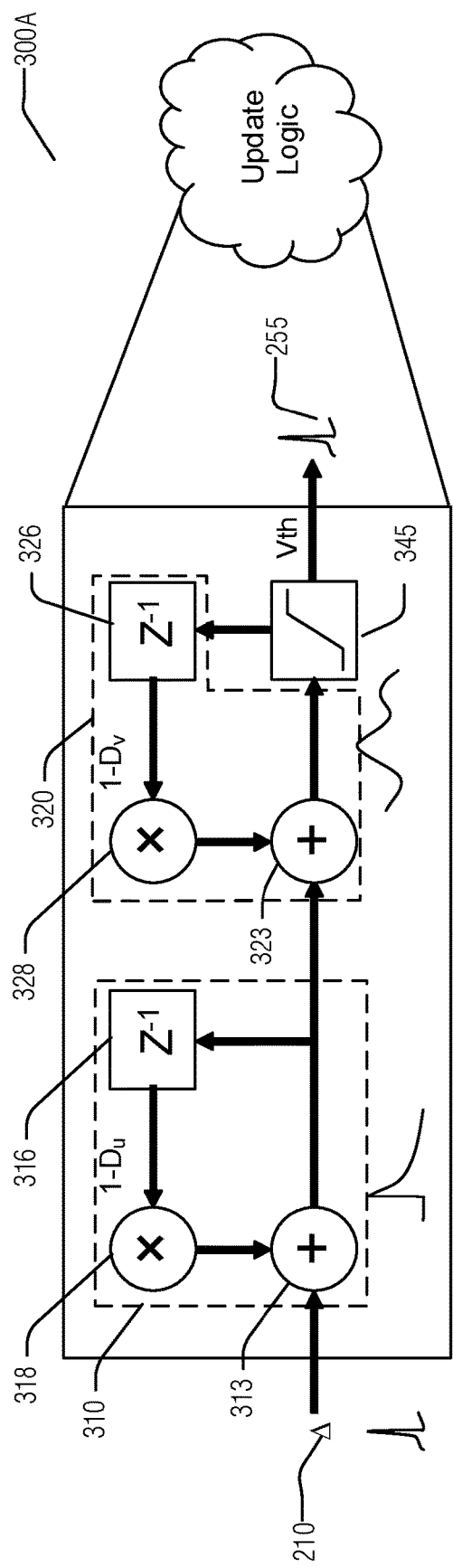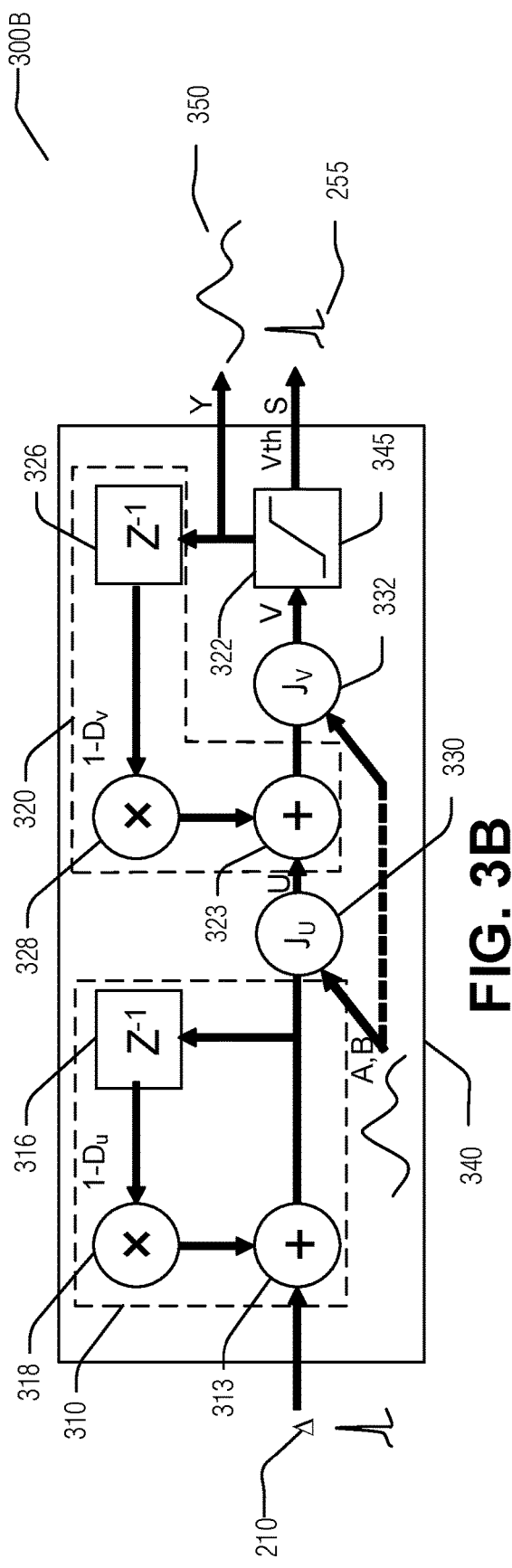
FIG. 3A
FIG. 3B

VARIABLE EPOCH SPIKE TRAIN FILTERING

TECHNICAL FIELD

The present disclosure relates generally to digital signal processing and, more particularly, to spike train filtering in spiking neural networks, where the spike train filtering is tolerant to a wide range of learning epoch durations. Some examples are applicable to neuromorphic computing using digital neuromorphic cores.

BACKGROUND

A neuromorphic processor is a processor that is structured to mimic certain aspects of the brain and its underlying architecture, particularly its neurons and the interconnections between the neurons, although such a processor may deviate from its biological counterpart. A neuromorphic processor may be composed of many neuromorphic (neural network) cores that are interconnected via a network architecture such as a bus or routing devices, which may direct communications between the cores. The network of cores may communicate via short packetized spike messages sent from core to core. Each core may implement some number of primitive nonlinear temporal computing elements (e.g., neurons). When a neuron's activation exceeds some threshold level, it may generate a spike message that is propagated to a set of fan-out neurons contained in destination cores. The network then may distribute the spike messages to destination neurons and, in turn, those neurons update their activations in a transient, time-dependent manner.

One or more state variables that represent the neuron's activation level may be maintained for each neuron. In typical operation, the state variables experience a step change in response to the occurrence of a spike at the input or the output, which decays as a function of time in an exponential manner. Historically, neurons have been modeled using analog architecture, which was well-suited to modeling exponentially-decaying state variables. In digital neuromorphic architectures, modeling of an exponentially-decaying function presents a number of computational challenges.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 2A is a pictorial diagram that illustrates a configuration of multi-compartment neurons and a dendritic accumulation process, according to an embodiment.

FIG. 2B is a pictorial diagram that shows a state structure of multiple compartments, according to an embodiment.

FIG. 3A is a block diagram illustrating state dynamics for a dendritic compartment according to a simple neuron model, according to an embodiment.

FIG. 3B is a block diagram illustrating state dynamics and the dendritic accumulation process for a dendritic compartment according to a multi-compartment neuron model, according to an embodiment.

DETAILED DESCRIPTION

Many biologically inspired neural network learning algorithms make use of filtered spike trains, or "spike traces", as dynamic variables in equations that describe the changes in network parameters over time. These trace variables commonly span a range of filtering time constants. Traces with small time constants measure precise time offsets between neighboring spike events, whereas traces with large time constants measure long-term average spike activity rates. Generally, the spike traces have been handled via an exponential decay applied between spike events. For example, when a first spike is received, a time offset from a last spike, or other time reference is recorded in temporary storage. When a subsequent spike is received, the offset is used to decay the first spike to produce a trace. The spike trace is then used as a baseline to which a decay of the second spike is added. In order to bound the provisioning of temporary storage, typically some maximum offset time is supported, and this defines a learning epoch. Trace values will be updated on every learning epoch event, at minimum, based on spike arrival time offsets, and on each learning epoch the network's learning rules will be evaluated. In this way, either short or long learning epoch durations may be supported. However, with low bit precision traces, this technique may only support small time constant traces with acceptable power or performance efficiency and accuracy due to rounding errors in combining several spike events.

To address this problem, purely spike-based learning architectures may be extended by adjusting inter-spike values and modifying exponential decay functions to address single spike events and multiple spike events differently. For example, the temporary spike storage may record a count of spikes, rather than a time-offset-since-event in multiple spike scenarios. This count may be used to reconstruct, or model, spike arrival when performing a single exponential decay operation across these several spikes. In so doing, errors, such as rounding errors, are reduced and fewer computations are carried out, leading to greater accuracy and efficiency. However, for a single spike during a relevant epoch, storing a timing offset and using that timing offset for the exponential decay provides great accuracy without additional computations. Thus, these enhancements greatly improve the efficiency and accuracy of large time constant traces (also known as rate-based traces) with marginal extra implementation cost compared to the baseline implementation.

Figure 5:
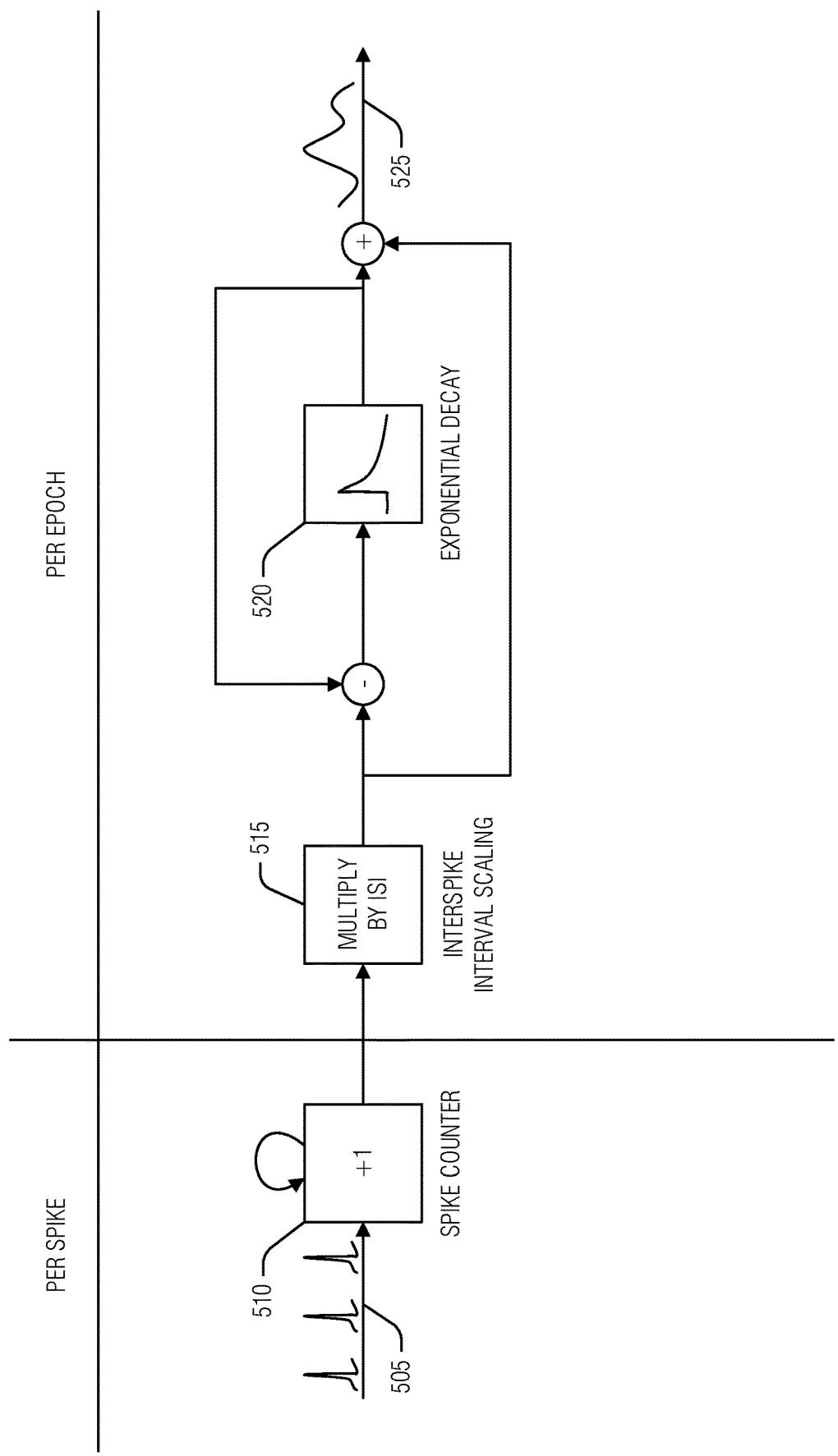
FIG. 5 is a block diagram illustrating component interactions for variable epoch spike train filtering, according to an embodiment.
Figure 6:
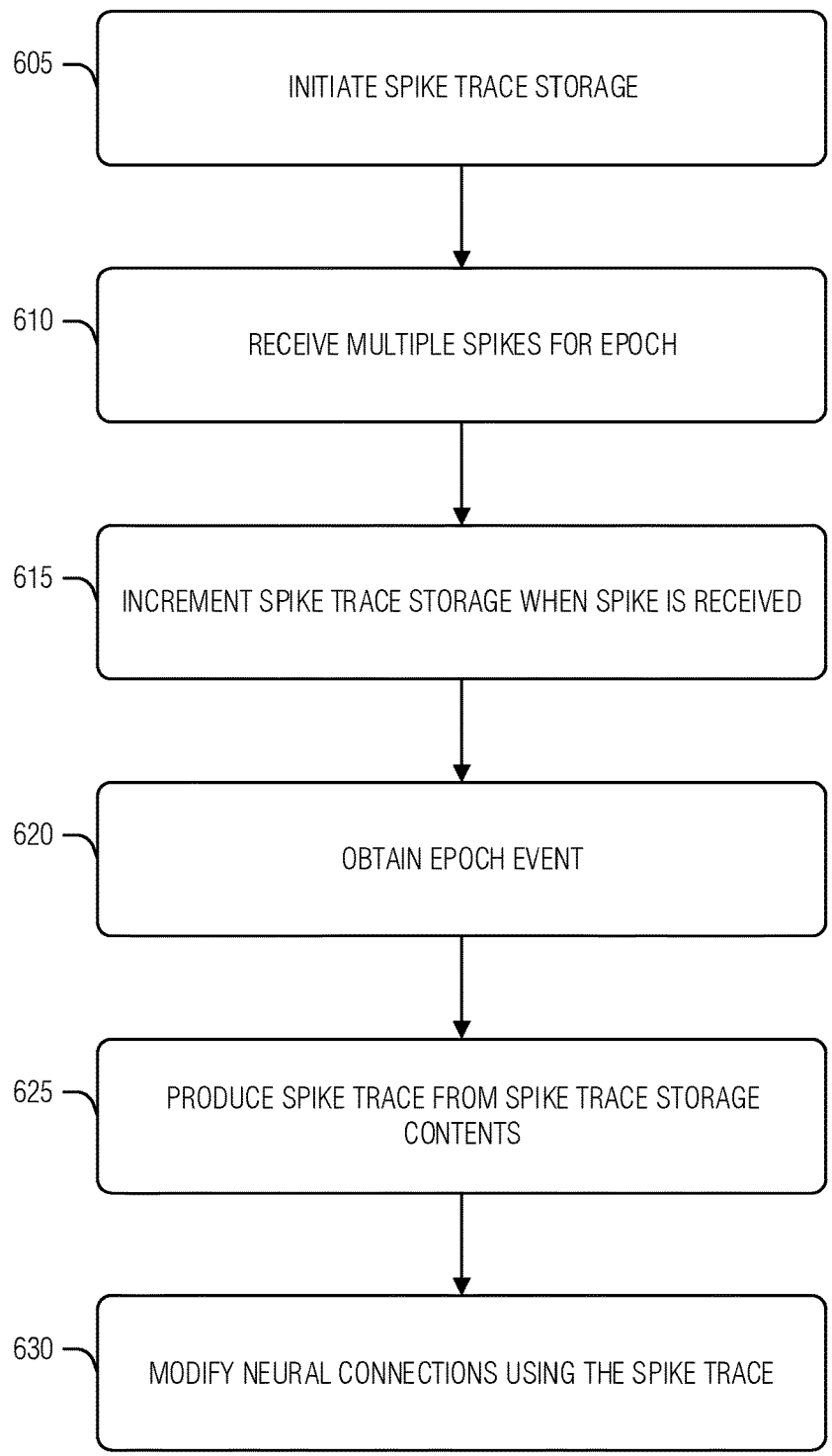
FIG. 6 illustrates a flow diagram of an example of a method for variable epoch spike train filtering, according to an embodiment.

FIGS. 1-4 illustrate neuromorphic hardware, such as an example of a neural core and its operation, in a baseline mode—for example, where each spike is exponentially decayed to update the spike traces. FIGS. 5 and 6 illustrate a modification to these baseline examples whereby spikes are counted and then this count is used in the exponential decay operations to update the spike traces.

Figure 1:
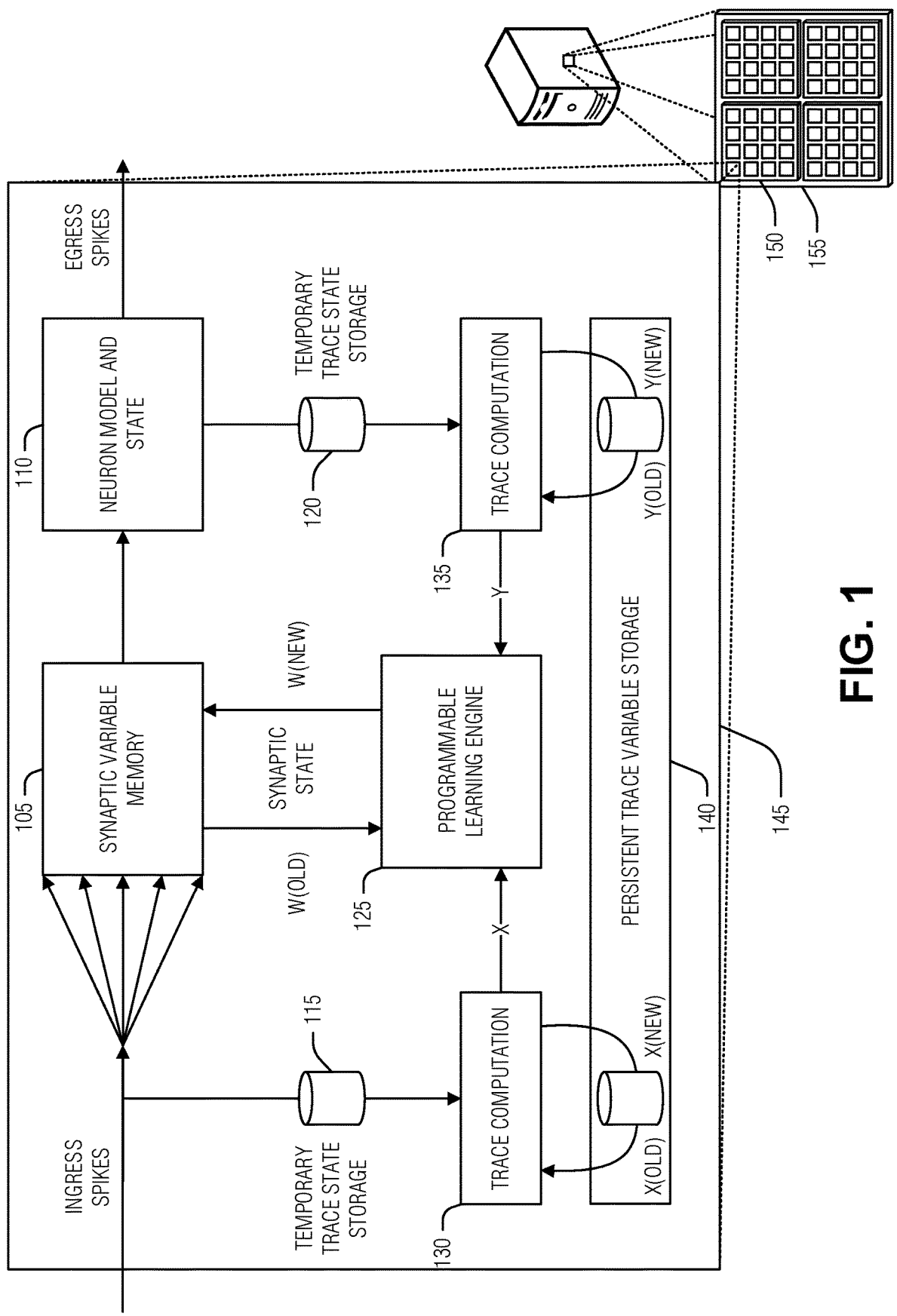
FIG. 1 is a high-level diagram of a model neural core structure, according to an embodiment.

FIG. 1 is a high-level diagram of a model neural core structure, according to an embodiment. A neural core 145 may be on a die with several other neural cores to form a neural chip 150. Several neural chips may also be packaged and networked together to form the neuromorphic hardware 155, which may be included in any number of devices, such as servers, mobile devices, sensors, actuators, etc. The illustrated neural core structure functionally models the behavior of a biological neuron. A signal is provided at an input (e.g., ingress spikes) to a synapse (e.g., modeled by the synaptic variable memory 105) that may include a fan-out within the core to other dendrite structures with appropriate weight and delay offsets. The signal may be modified by the synaptic variable memory 105 (e.g., synaptic weights may be applied to spikes addressing respective synapses) and made available to the neuron model 110. The neuron model 110 may include a number of components to model dendrite activity and soma activity. In an example, the structures may include a dendrite accumulator and a soma state store. The neuron model 110 is configured to produce an output spike (e.g., egress spikes via an axon to one or several destination cores) based on weighted spike states.

In an example, a neuromorphic computing system may employ spike-timing-dependent plasticity (STDP) learning. Here, a network of neural network cores communicate via short packetized spike messages sent from core to core. Each core implements some number of neurons, which operate as primitive nonlinear temporal computing elements. When a neuron's activation exceeds some threshold level, it generates a spike message that is propagated to a set of fan-out neurons contained in destination cores. In managing its activation level, a neuron may maintain a trace variable that is incremented (e.g., as an impulse response) in response to a spike. Operations on the trace variable may model a number of time-dependent features. For example, following a spike, the trace variable may decay in an exponential manner. This exponential decay, modeled as an exponential function, may continue for a number of time steps, during which additional spikes may or may not arrive. Other example uses of the trace variable (e.g., spike trace storage) are discussed below.

To facilitate spike trace management, storage 115 may record temporary ingress spike information and storage 120 records temporary egress spike information. In addition, Persistent trace variable storage 140 maintains trace information over time. The storages 115, 120, and 140 are used by the trace computation circuitries 130 and 135 (e.g., trace decay modelers) to provide updated ingress and egress traces for use by the learning engine 125. At a learning epoch event, such as the end of the epoch, the learning engine 140 uses the ingress trace X, egress trace Y, and the current synaptic weights W(old) to produce a new set of synaptic weights W(new). The new synaptic weights are then installed in the synaptic variable memory 105 to modify (e.g., weight) future ingress spikes, thus modifying the likelihood that a particular combination of ingress spikes causes an egress spike. Thus, the architectural role of the trace computation circuitries 130 and 135 is to maintain trace variable state X and Y respectively, in response to spike events either received as input to the core (ingress spikes) or produced by the neuron units 110 inside the core (egress spikes). Each spike event may generate temporary state for the trace computation that is accumulated over the duration of a periodic interval of time defined as the learning epoch. At the end of each learning epoch, the learning engine modifies synaptic variable state (W) as a function, in part, of the computed X and Y trace values.

The network distributes the spike messages to destination neurons and, in response to receiving a spike message, those neurons update their activations in a transient, time-dependent manner, similar to the operation of biological neurons.

The basic implementation of some applicable learning algorithms may be provided through spike timing dependent plasticity, which adjusts the strength of connections (e.g., synapses) between neurons in a neural network based on correlating the timing between an input (e.g., ingress) spike and an output (e.g., egress) spike. Input spikes that closely proceed an output spike for a neuron are considered causal to the output and their weights are strengthened, while the weights of other input spikes are weakened. These techniques use spike times, or modeled spike times, to allow a modeled neural network's operation to be modified according to a number of machine learning modes, such as in an unsupervised learning mode or in a reinforced learning mode.

The core may also support backwards-propagation processing. In biology, when the soma spikes (e.g., an egress spike), in addition to that spike propagating downstream to other neurons, the spike also propagates backwards down through a dendritic tree, which is beneficial for learning. The synaptic plasticity at the synapses is a function of when the postsynaptic neuron fires and when the presynaptic neuron is firing—the synapse knows when the neuron is fired. In a multi-compartment architecture, once the soma fires, there are other elements that know that the neuron fired in order to support learning, e.g., so all of the input fan-in synapses may see that the neuron fired. The learning engine 125 may implement spike timing dependent plasticity (STDP) and receive this backwards action potential (bAP) notification (e.g., via the trace computation circuitry 135) and communicate with the synapses 105 accordingly.

FIG. 2A is a pictorial diagram that illustrates a configuration of multi-compartment neurons and a dendritic accumulation process, according to an embodiment. The diagram of FIG. 2A illustrates a dendritic (e.g., post-synaptic within a modeled neuron) accumulation process for handling and scheduling spikes into the future inside a neural core. Synaptic inputs 210 are provided to a dendrite accumulator structure 220, which may be configured as a dedicated data store, or a data structure allocated in a general data store, to maintain synaptic stimulation counters of weight values for a particular compartment 230. In the present context, a compartment 230 is an abstract neural unit that contains state and configuration variables 240 representing the dynamic state of a neuron. It is a component of a dendritic tree that may be processed in sequence with related compartments. Preserving some state information for a compartment 230 and passing it along as the compartments are processed provides for a broad class of information processing that may take place in the core.

A dendrite accumulator structure 220 may maintain synaptic stimulation counters of weight values for a particular compartment 230, with the compartment being a breakdown of a neural tree structure or simply an abstract neural unit. Each compartment 230 may have state variables (u, v) that represent a dynamic state of the neuron.

A sequential process with the update logic 250 may iterate through all of these compartments 230, receiving accumulated synaptic stimulation and state variables 245 from each of the compartments 230, and provide a spike output 255. Because this is a sequential process, the update logic 250 may preserve transient state information that is associated with each compartment by utilizing temporary register storage in the logic. By propagating this information according to the dataflow of a tree, the process may emulate the information processing of a biological dendritic tree.

FIG. 2B is a pictorial diagram that shows a state structure of multiple compartments, according to an embodiment. FIG. 2B illustrates how a sequential iteration through the compartment indices 230 generally resembles a tree. Each of the rows 230 of this state structure, which may be memory addresses in the core's SRAMs, represents a compartment 230 that receives synaptic input 210, via synaptic connections 260. The core walks through these with numbers and state variables 245 being propagated from each of the compartments 230, up to one final route compartment 230A which would be the soma (in the biological nomenclature), which provides a spike output 255. All of the other compartments 230 in FIG. 2B operate in a similar fashion and thereby transform and propagate the temporary dendritic state. Any dendrite index may be configured as either a compartment in the dendritic tree or a soma. Each compartment in the tree structure may transform and propagate the (u, v) state variables according to a real-value signal processing model, as described below.

FIG. 3A is a block diagram illustrating state dynamics for a dendritic compartment according to a simple neuron model, according to an embodiment. The dynamics for a dendritic compartment 300A (use of the term "dendrite" below is to be construed synonymous with, and as shorthand for, the phrase "dendritic compartment") according to the simple neuron model, which is basically a discrete time filtering circuit. A first state variable operation 310 may be performed that is based on a stored first state variable, in this example, the current U, and the spike input 210 received. A second state variable operation 320 may then be subsequently performed that is based on a stored second state variable, in this example, the voltage V, and the output of the first variable operation 310. A threshold function 345 may be utilized to determine if the dendritic compartment 300A should spike or at least indicate a spiking value even if it does not actually spike.

FIG. 3B is a block diagram illustrating state dynamics and the dendritic accumulation process for a dendritic compartment according to a multi-compartment neuron model, according to an embodiment. The dendritic compartments 300B, 300A may be, for example, the dendritic compartments 230 described above. The diagram of FIG. 3B is similar to the diagram in FIG. 3A, and a description of similar elements will not be repeated. However, in the design shown in FIG. 3B, to enhance the design for the multi-compartment processing, two points Ju 330, Jv 332, have been added in the logic where information coming from earlier compartments A, B 340 in the sequential process may be joined.

As an example, a neuron may be stimulated with both excitatory and inhibitory input, each with its own exponential filtering time constant. This spiking neuron model and networks of these neurons may be capable of implementing powerful neural information processing algorithms (e.g., E/I networks).

With the multi-compartment support described herein, an E/I neuron may be constructed out of two primitive units, one that integrates the 'E' input with the $\tau_E$ time constant, the other the 'I' input with $\tau_I$ time constant. In another example, a more complex single neuron model may include the complexity of the E/I neuron implementation. Since many neuromorphic algorithms may not need this complexity, the presently described architecture provides a flexible and efficient neuromorphic processing solution. The architecture may be generalized to an extremely flexible neuromorphic neuron processor that may, through programming, implement conventional neuron models (some with potentially significant value for machine learning applications).

The structure described above provides a way to join in, as in a tree structure, the earlier input A, B 340 on towards the leaves of a dendritic tree. In each of these join operations Ju 330, Jv 332, there are two state variables u (current) and v (voltage), which are two dynamic variables, that are interlinked. Since there are two such variables in this example, there are two different join possibilities (join points in the signal flow) 330, 332.

The current from the earlier input 340 may be provided at a first junction point 330, and the voltage from the earlier input 340 may be provided at a second junction point 332. A spike function 322 may determine if a spike threshold value has been reached to determine whether to send a spike S 255 (or value representative of a spike), and furthermore, a value Y 350 (i.e., one or more numbers representing state variables of the dendritic compartment 300B) that includes further information in a form of continuous data related to the current state of the dendritic compartment 300B.

In biology, an efficiency may be realized by communicating numbers 350 (i.e., continuous data) as opposed to just binary spike values 255. The generation of neural networks that is focused on spiked base signaling is largely driven by the efficiency that comes from long-range parallel communication using just a bare minimum of information for energy and performance efficiency. Although it is possible to process a large space of algorithmic problems with a spike based signaling methodology, this approach only goes so far. There is still value in communicating numbers 350 as opposed to just binary spike events 255 with temporal codes, specifically when the communication is sufficiently local. Biological neurons use their dendritic trees for this purpose. A dendritic tree may be viewed as a spatially local region of the neuron over which it is efficient to send continuous current or voltage values across the membrane of the neuron.

A series of join operations may be provided that are similar to an instruction set that the core supports. For example, one might add the u variable along with an input from another compartment. Or, instead of an add operation, a multiply operation may be used as the join operation. One could also include, for example, an AND of a spiking condition of whether the input compartment is past its threshold or not, and then whether this compartment's v has passed its threshold or not—one could take the AND condition of those two, or the OR condition of those two. There are a number of different operations that may be defined (see Table 1 below).

The structure that includes information from other compartments gives the dendritic tree structure a large amount of computational capability, compared to either a conventional feed-forward Artificial Neural Network model or a pure spike-based network. This creates a very flexible interlinked dynamic system of these differential equation state variables. The design features backwards, event-driven sequential traversal of the sequential units to propagate spiking information back to the synapses for synaptic plasticity (e.g., weight updates according to STDP rules). Disrupting the forward iteration over the units comes at a cost in performance and energy and therefore is only done sparingly, i.e., whenever a unit spikes. Typically, this occurs when the root of the tree, corresponding to the neuron's soma compartment, spikes.

In biology, when the soma spikes, the spikes propagate backwards, down through the dendritic tree—this is beneficial for learning. Generally, the synaptic plasticity at the synapses is a function of when the postsynaptic neuron fires and when the presynaptic neuron is firing, so the synapse needs to be informed of when the neuron is fired. A multi-compartment architecture may pose a problem for learning once the soma compartment fires, since there are other input compartments that also need to be informed that the neuron fired in order to support learning, so that all of its input fan-in synapses may see that event. This may be part of a spike timing dependent plasticity (STDP) model, which may implement Hebbian learning, anti-Hebbian learning, and other models.

The backwards propagation may be implemented without further configuration of the core to allow the core to communicate spikes backwards. However, for the sake of efficiency, it may be undesirable for the backwards propagation to be continuously active. Because a time-multiplexed pipelined implementation is used (for an efficient hardware realization), there are multiple forward processing steps all in execution as the system is iterating through all of the compartments. The backwards spike propagation may be considered analogous to an exception in normal processor technology. The pipeline may be flushed, and the processing may go back to some known point. Here, the process will identify a spiking compartment as it iterates through the compartments—at which point the processor may need to flush the active compartments and then perform a backwards traversal/propagation. In an example, the spike event, so back-propagated, may then be stored in the postsynaptic trace state storage 120.

Figure 4:
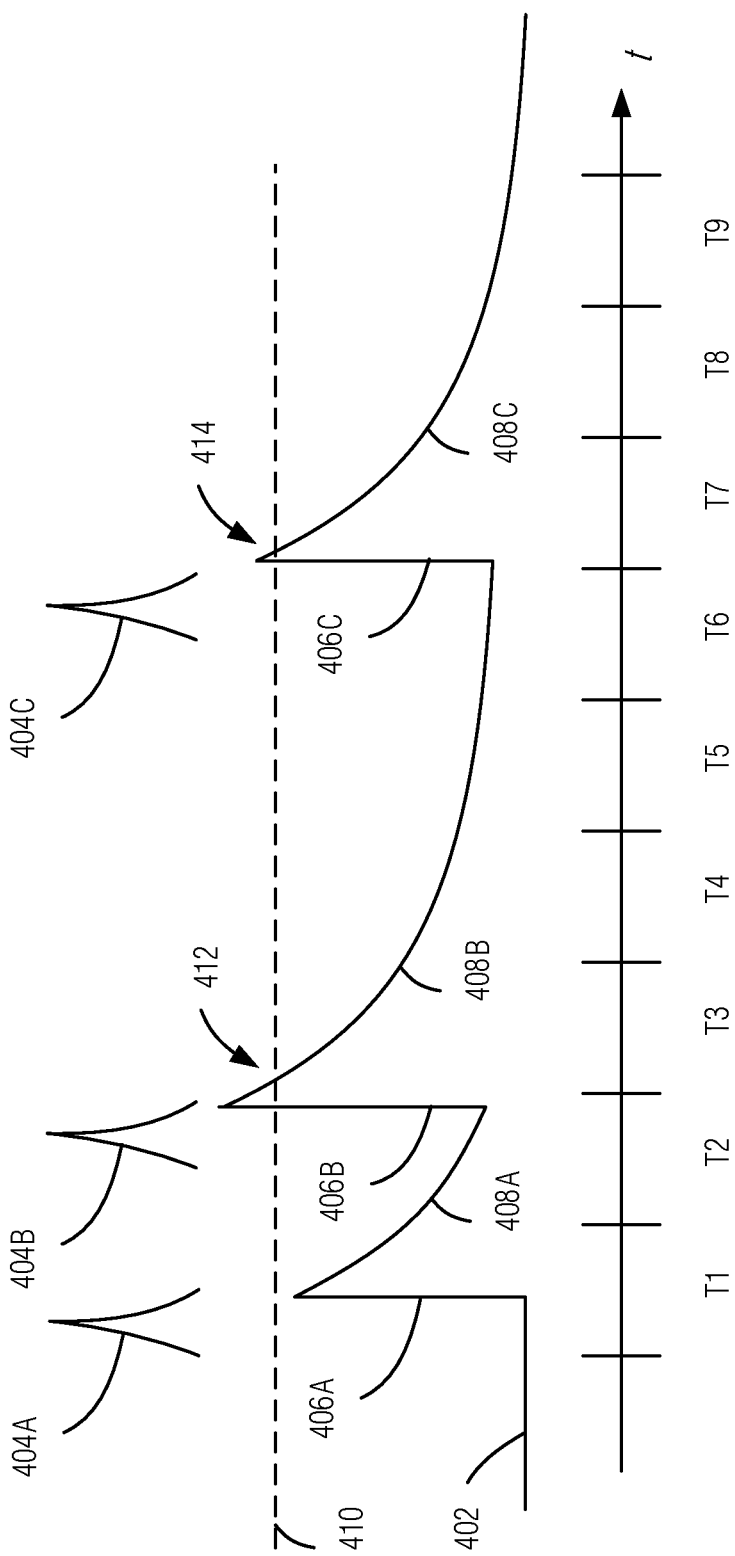
FIG. 4 is a simplified timing diagram illustrating a trace variable as a function of time, according to an example use case, according to an embodiment.

FIG. 4 is a simplified timing diagram illustrating a trace variable 402 as a function of time, according to an example use case, according to an embodiment. This trace variable 402 may be maintained at a neuron, as a function of time t, according to an example. For the sake of simplicity and ease of illustration, trace variable 402 is depicted as a continuous function over time periods T1-T9, though in a practical embodiment, each time period T1-T9 may contain 50-100 actual discrete time increments, and the value of trace variable 402 would remain constant for the duration of each individual time step.

Input stimuli 404A, 404B, and 404C (collectively referenced as input events 404) are shown as impulses, which may be spikes at the input or output of the neuron. Input events 404 may vary in their weighting in some implementations. Each input stimulus 404A-404C causes a response in the neuron that affects the trace variable 402. In the example depicted, each input stimulus causes a step change in the positive direction, indicated at 406A, 406B, and 406C, followed by an exponential decay as indicated at 408A, 408B, and 408C. The exponential decay 408 follows an exponential curve that may be defined with a time constant τ. The neuron may be configured with an activation threshold 410 which, when exceeded by the trace variable (as depicted at 412 and 414), may cause a corresponding activation response, such as an output spike or a change in the neuron's input weight or threshold (not shown). The resulting trace is a filtered temporal spike train trace.

A basic computation of each exponential decay function over n time increments may be expressed as $x_n = x_0 \alpha^n$, where $x_0$ represents the initial value, and α is a decay factor that corresponds to the time constant τ of the exponential function. As a basic approach, n multiplication operations would be computed. However, according to some embodiments, an N-bit expression of n may be represented in binary as $n = \Sigma_{i=0}^{N} n_i 2^i$, where $n_i$ represents the binary value for each bit position i. Advantageously, this computational technique reduces the $x_n$ computation to at most $[\log_2 n]$ multiplication operations according to $x_n = x_0 \Pi_{i|n_i=1} \alpha^{2^i}$.

In a related embodiment, a quantity N constants of $\alpha^{2^i}$ are pre-computed and stored in a data store to be looked up rather than computed for improved computational efficiency.

In a related embodiment, the neuron performs a delayed computation of the exponential decay function at the time when the decayed value of the exponential decay function is to be used for processing or decision-making, such as in response to an input stimulus. Thus, during the time increments when there are no input stimuli, the neuron engine is free from having to compute the exponential decay of the trace variable. This relieves the system from having to expend energy and computational resources, particularly when a delayed computation of the decayed result may be performed with fewer operations, as exemplified above. In performing the delayed exponential decay computation, the time increments during which the function experienced decay are taken into account.

The exponential decay illustrated in FIG. 4 represents a baseline technique that performs decay on the spikes based on individual spike time offsets. Thus, this technique may be viewed as a literal implementation of spike-based computation, wherein all state variables in the architecture are updated per spike event (even if the actual computation is delayed until a learning epoch event). For spiking neural network inference and short timescale learning algorithms, this approach is efficient. However, for long-timescale trace variables, this solution may spend too much time and energy updating trace state and also may have difficulty maintaining accuracy due to repeated numerical rounding.

To address these issues, the spike time offset (e.g., SpikeTime) state associated with each trace variable within each learning epoch may be repurposed. Instead of maintaining spike offset times (e.g., SpikeTime), when so configured, this state is used to count the number of spike events received in the learning epoch (e.g., SpikeCount), and the downstream exponential decay machinery then provides a superset of what is arithmetically required to compute long timescale (rate-averaged) trace values with high accuracy. With negligible additional configuration parameters and logic compared to the baseline solution above, the trace function may support exact spike train filtering under the assumption that the SpikeCount spikes occur uniformly spaced in time.

Referring back to FIG. 1, the trace computation units are used to perform the SpikeCount based decay of spikes to produce spike traces. Thus, in response to spike events either received as input to the core (ingress spikes) or produced by the neuron units inside the core (egress spikes), the trace computation maintains trace variable state X and Y respectively. Each spike event generates temporary state for the trace computation that is accumulated over the duration of a periodic interval of time defined as the learning epoch. At the end of each learning epoch, the learning engine modifies synaptic variable state (W) as a function, in part, of the computed X and Y trace values. In an example, the hardware structures shown in FIG. 1 may be time multiplexed over a large number of neural resources maintained by the neuromorphic processor. The operations described here apply to each neural unit and may be implemented in hardware in a concurrent or pipelined fashion for efficiency.

In the baseline trace computation described above, the temporary (e.g., per-epoch) trace state indicated above is the spike time offset within the epoch that the spike occurred. For each spike event, the old trace variable (e.g. X(old)) is exponentially decayed to the time of the spike, with a spike impulse amount then added and decayed again to the end of the epoch (e.g., to the current time). The updated trace values X and Y (e.g., X(new) and Y(new)) are then presented to the learning engine.

For learning rules that expect high temporal precision, such exact decay calculations may be useful in order to distinguish spike time differences on the granularity of single time steps. However, when the learning rules expect trace values that have been averaged over a large number of spike events (e.g., filtered with large time constants), the trace values become insensitive to the specific time offsets within the epoch. In that case, temporally precise decay calculations may be needlessly expensive (e.g., in terms of processing time, storage use, etc.). Furthermore, given the very low bit precisions of typical neuromorphic implementations, rounding errors may be relatively large (e.g., even with stochastic rounding) and apply to each individual decay calculation. For rate traces, rounding errors therefore accumulate and may significantly degrade the eventual accuracy of the trace result as presented to the learning engine.

FIG. 5 is a block diagram illustrating component interactions for variable epoch spike train filtering, according to an embodiment. These interactions illustrate an enhancement to the baseline decay operations of FIG. 4 to address the issues noted above. For example, rather than store a single spike arrival time value within an epoch (e.g., in the "Temporary trace state storage" memory), an accumulated spike count 510 is maintained for ingress spikes 505. The count 510 is reset to zero at the beginning of each epoch and subsequently increments on each spike event during the epoch. In an example, the count 510 has a maximum supported value, after which additional spikes will not be counted. Spike counting is the only per spike processing performed.

To simulate arrival times of the counted spikes, the count 510 may be scaled 515 by an ISI parameter. In an example, the single ISI parameter corresponds to a minimum inter-spike interval (e.g., spike spacing) that is used to scale the total spike count 515 in an epoch to an impulse value that, for example, is optimal for the dynamic range of the trace variable:

$$\text{Impulse}=(\text{SpikeCount}*(\text{ISI}+1))*2^{SHIFT+1} \quad (1)$$

where 'SHIFT' is a constant dependent on the trace variable bit width (e.g., SHIFT=width of the trace state variable minus the width of the maximal SpikeCount*(ISI+1) product). Given the Impulse value from equation (1), the trace computation may apply a single exponential decay calculation 520 per epoch to the prior epoch's trace value X[i−1] to obtain the current end-of-epoch trace value X[i] 525:

$$X[i]=\text{expDecay}(\text{Tau}, \text{Tepoch}, X[i-1]-\text{Impulse})+\text{Impulse} \quad (2)$$

where expDecay( ) exponentially decays the "X[i−1]−Impulse" trace input value by Tepoch time steps (e.g., the number of time steps in the epoch period) with some time constant Tau. For example, this function may be implemented in the manner described above with respect to FIG. 4. According to that implementation, as long as Tepoch is a power of two (e.g. 2, 4, 8, 16, 32, etc.), only a single multiplication and stochastic rounding is used, the minimum possible.

Mathematically, computing Impulse and X[i] in the manner described in equations (1) and (2) corresponds to an ideal case of the SpikeCount spike events occurring uniformly spaced over the epoch at Tepoch/SpikeCount intervals, with the first event delayed by Tepoch/(SpikeCount*2). This is the optimal spike pattern for minimizing numerical jitter in the computed trace value 525 from epoch to epoch.

An advantage of using the SpikeCount decay over the baseline SpikeTime decay is the reduction in rounding errors over larger epoch time frames as well as increased computational efficiency. In the baseline fully spike-based solution (e.g., where each SpikeTime is tracked and decayed), there is no "Spike Counter" accumulation stage that here serves to aggregate multiple spikes into a single event handled per epoch. A fully spike-based solution generally activates the Exponential Decay circuitry twice per spike: once to obtain the decayed trace value at the spike time prior to adding a new spike impulse, and a second time to obtain an end-of-epoch trace value. Each Exponential Decay may further perform more than one multiplication operation per decay iteration, depending on the implementation of the expDecay( ) function (e.g., in hardware). Hence, while a fully spike-based implementation is more faithful to the fundamental biological model, for rate-based traces, it is both less accurate due to numerical rounding effects and less computationally efficient than the SpikeCount based solution. The table below illustrates some differences between the SpikeTime baseline and the SpikeCount architectures:

| | SpikeTime Architecture | SpikeCount Architecture | Benefit |
|---|---|---|---|
| Number of exponential decays per learning rule evaluation: | 2 * spike arrival rate | 1 * epoch rate | ~2-8x lower energy and higher performance for trace evaluation. |
| Number of times the trace variable is rounded | >2 per epoch | 1 per epoch | Reduced rounding error |
| Number of spike arrivals supported per epoch | 1 | 16+ | ~10x reduction in learning rule evaluation frequency, reducing energy, improving performance, and reducing numerical error for applications that only use rate-based trace variables. |
| Number of exponential decay units required | 1 | 1 | Reuses the same HW resources |
| Additional Configuration bits | — | 3-4 bits | Negligible extra configuration overhead. |
| Additional Arithmetic | — | Low precision multiplier (~3b × 6b), ~6 bit counter and subtractor | Minimal extra hardware overhead. |

The SpikeCount architecture may be minimally modified to allow for the accuracy of the SpikeTime architecture for sparse spikes in an epoch. That is, that spike-time based trace decay (e.g., SpikeTime architecture) and spike-count based rate decay (e.g., SpikeCount architecture) modes need not be mutually exclusive for a particular trace variable. In an example, one additional bit in the temporary SpikeTime/SpikeCount trace state value may be used to distinguish the value between "one spike with SpikeTime" and "more than one spike with SpikeCount" cases. In the former case, the trace variable may be updated in a temporally precise manner based on the spike time offset (e.g., SpikeTime). In this case, the baseline decay is applied to the SpikeTime value. In the latter case, the optimized rate-based approximation may be applied as a function of the SpikeCount value. Such an implementation optimally unifies the trace computation across spike-based and rate-based regimes.

FIG. 6 illustrates a flow diagram of an example of a method 600 for variable epoch spike train filtering, according to an embodiment. The operations of the method 600 are performed by computer hardware, such as that described above (e.g., neuromorphic hardware), or below (e.g., processing circuitry).

At operation 605, a spike trace storage (e.g., temporary trace state storage or the like) is initiated (e.g., set to a default value, reset, etc.) for an epoch. In an example, the spike trace storage is included in a neural unit of neuromorphic hardware. In an example, the spike trace storage is a register of the neural unit. The epoch is a time period over which the neural unit is modified. That is, the behavior of the neural unit with respect to changing the way in which egress spikes are generated based on ingress spikes is constant for the epoch. The time period may be defined by time steps of the neuromorphic hardware such that a time step is incremented upon certain signaling activity (or opportunity) within the neuromorphic hardware rather than an external record of elapsed time (such as elapsed seconds, minutes, etc.).

At operation 610, multiple spikes may be received at the neural unit during the epoch.

At operation 615, the spike trace storage is incremented for each of the multiple spikes to produce a count of received spikes. As noted above, the spike trace storage is tracking how many spikes arrived, rather than a time offset of a spike arrival.

At operation 620, an epoch learning event is obtained. In an example, the epoch learning event is an end of the epoch. The epoch learning event may be signaled to (e.g., received by) the neural unit or the neural unit may sense (e.g., retrieve) the epoch event from an external source (e.g., a meta data register of the neuromorphic hardware). The epoch learning event signals the initiation of per epoch, rather than per spike, activity in the neural core for learning (e.g., updating) purposes.

At operation 625, a spike trace is produced in response to the epoch learning event using the count of received spikes in the spike trace storage. In an example, producing the spike trace using the count of received spikes includes scaling the count of received spikes by a constant. In an example, the constant is a minimum inter-spike interval. In an example, producing the spike trace using the count of received spikes includes multiplying the scaled count of received spikes by two raised to the power of SHIFT plus one. Here, SHIFT is a constant. In an example, SHIFT is defined by a width of the spike trace storage (e.g., in bits) minus a width of a maximal scaled count of received spikes. These operations allow a reconstruction of spikes based on the spike count. Although individual spikes may have arrived with differing offsets, this model assumes a uniform arrival time of the spikes. It is to these reconstructed spikes that a decay model may be applied.

In an example, producing the spike trace using the count of received spikes includes applying a single exponential decay to a prior epoch trace value to obtain the spike trace. This illustrates that the decay is applied once per epoch, rather than the once per spike decay application of the baseline architecture described above. In an example, the single exponential decay is calculated by the following equation:

$X[i] = \text{expDecay}(\text{Tau}, \text{Tepoch}, X[i-1] - \text{Impulse}) + \text{Impulse}$ where X[i] is the spike trace, X[i−1] is the prior epoch trace, Impulse is the scaled count of received spikes, Tepoch is a number of time steps in the epoch, and Tau is a constant. In an example, Tepoch is a power of two.

At operation 630, neural connections of the neural unit may be modified using the spike trace (e.g., X[i]). In an example, modifying the neural connections of the neural unit using the spike trace includes modifying a synaptic variable state as a function of the spike trace. Thus, the learning occurs as synaptic weights are adjusted based on the interactions of the ingress spikes and egress spikes as modeled by, for example, trace computation circuitries and the programmable learning engine of FIG. 1.

The examples described above specifically related to the use of a spike counter instead of a spike time offset. However, the operations of the method 600 may be extended to include a hybrid model whereby a single spike during an epoch may be treated (e.g., decayed) according to the base line architecture and multiple spikes may be treated as above. For example, the method 600 may include initiating the spike trace storage for a second epoch, receiving a single spike during the second epoch, and storing a spike arrival since epoch (e.g., spike time offset) in the spike trace storage. Here, if there are no other spikes received during the epoch, upon obtaining a second epoch learning event for the second epoch, the method 600 may produce a second spike trace in response to the second epoch learning event using the spike arrival since epoch in the spike trace storage. In an example, producing the second spike trace in response to the second epoch learning event using spike arrival since epoch, includes applying an exponential decay based on the spike arrival since epoch. Thus, the second spike trace may use a SpikeTime exponential decay rather than the SpikeCount decay described above with respect to operation 625. In an example, the spike trace storage includes a bit that indicates whether a single spike or multiple spikes arrived during a given epoch, and wherein the exponential decay of the spike trace storage as either of count of received spikes or spike arrival since epoch is governed by the bit. The method 600 may then modify the neural connections of the neural unit using the second spike trace.

Figure 7:
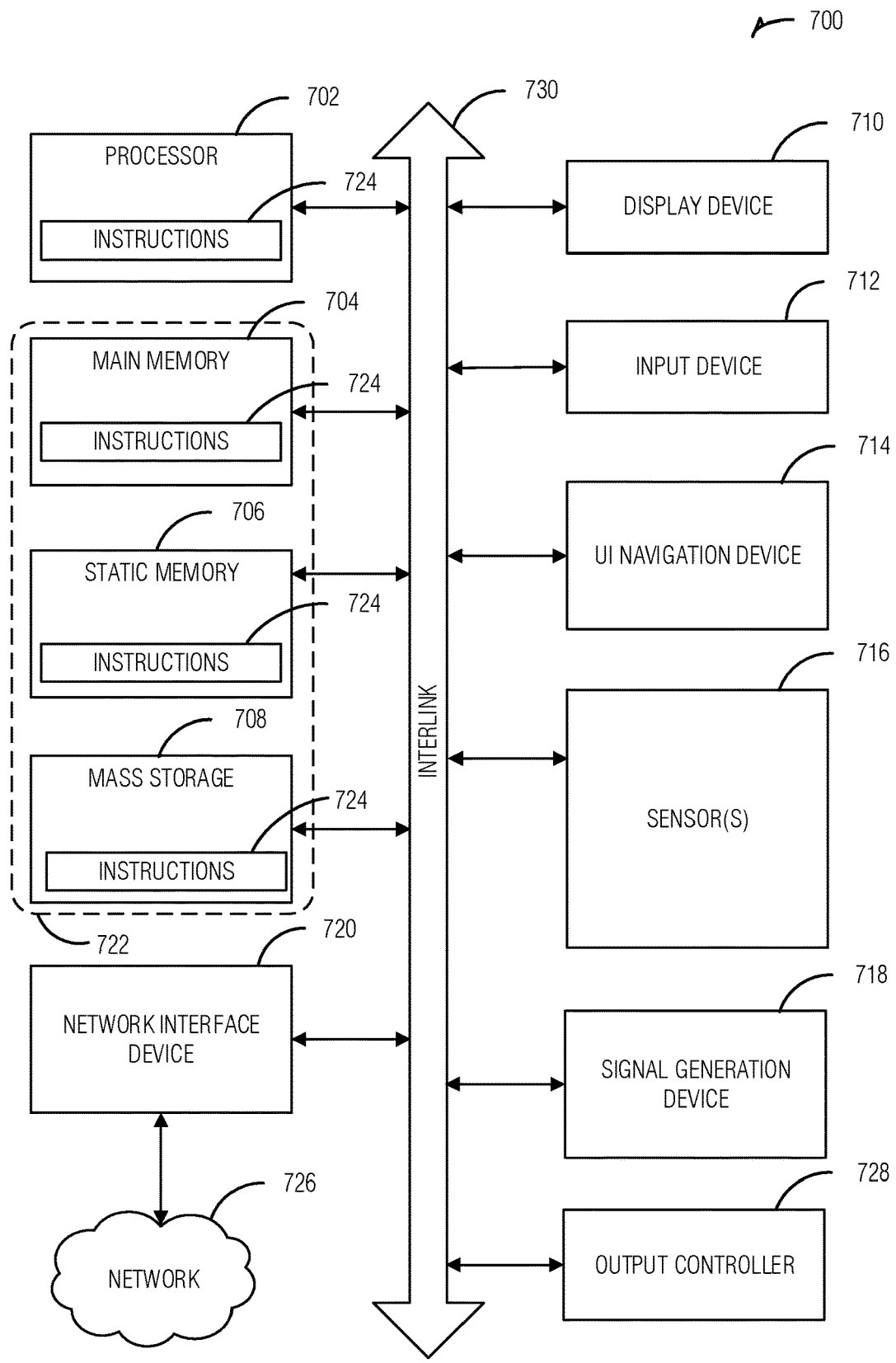
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. Examples, as described herein, may include, or may operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 700 follow.

In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 700 may include a hardware processor 702 (e.g., a central processing unit (CPU), a graphics processing unit (GPU), a hardware processor core, or any combination thereof), a main memory 704, a static memory (e.g., memory or storage for firmware, microcode, a basic-input-output (BIOS), unified extensible firmware interface (UEFI), etc.) 706, and mass storage 708 (e.g., hard drive, tape drive, flash storage, or other block devices) some or all of which may communicate with each other via an interlink (e.g., bus) 730. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 708, a signal generation device 718 (e.g., a speaker), a network interface device 720, and one or more sensors 716, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 702, the main memory 704, the static memory 706, or the mass storage 708 may be, or include, a machine readable medium 722 on which is stored one or more sets of data structures or instructions 724 (e.g., software) embodying or utilized by any one or more of the techniques or functions described herein. The instructions 724 may also reside, completely or at least partially, within any of registers of the processor 702, the main memory 704, the static memory 706, or the mass storage 708 during execution thereof by the machine 700. In an example, one or any combination of the hardware processor 702, the main memory 704, the static memory 706, or the mass storage 708 may constitute the machine readable media 722. While the machine readable medium 722 is illustrated as a single medium, the term "machine readable medium" may include a single medium or multiple media (e.g., a centralized or distributed database, or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may be further transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine readable medium.

FIGS. 8 through 17 illustrate several additional examples of hardware structures or implementations that may be used to implement computer hardware.

Figure 8:
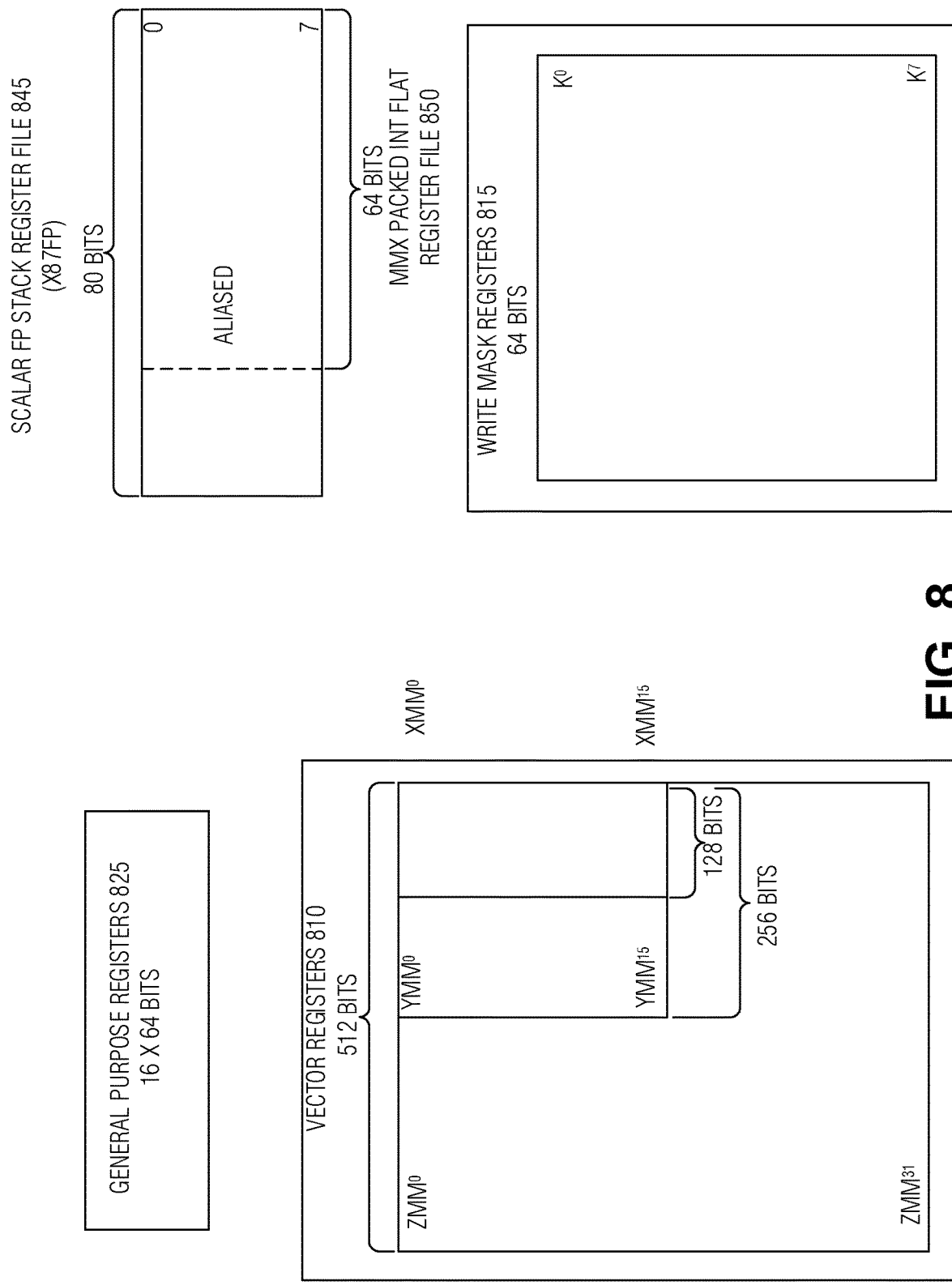
FIG. 8 is a block diagram of a register architecture according to one embodiment of the invention.

FIG. 8 is a block diagram of a register architecture 800 according to one embodiment of the invention. In the embodiment illustrated, there are 32 vector registers 810 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15.

Write mask registers 815—in the embodiment illustrated, there are 8 write mask registers (k0 through k7), each 64 bits in size. In an alternate embodiment, the write mask registers 815 are 16 bits in size. As previously described, in one embodiment of the invention, the vector mask register k0 cannot be used as a write mask; when the encoding that would normally indicate k0 is used for a write mask, it selects a hardwired write mask of 0xFFFF, effectively disabling write masking for that instruction.

General-purpose registers 825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 845, on which is aliased the MMX packed integer flat register file 850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Figure 9:
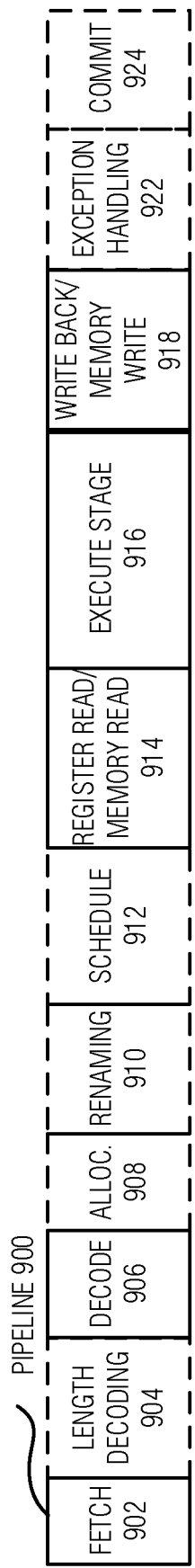
FIG. 9 is a block diagram illustrating both an exemplary in-order pipeline and an exemplary register renaming, out-of-order issue/execution pipeline according to embodiments of the invention.
Figure 10:
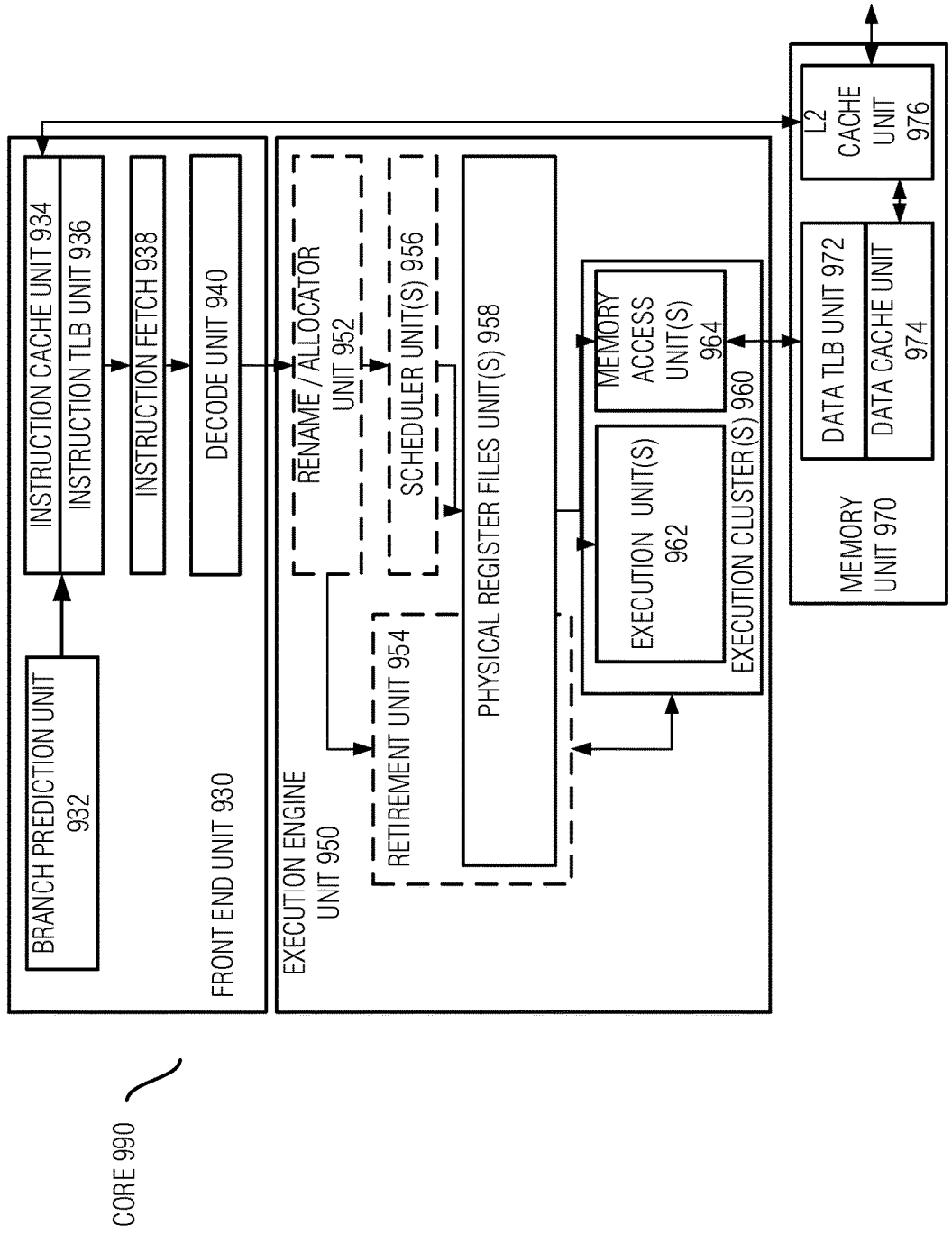
FIG. 10 is a block diagram illustrating both an exemplary embodiment of an in-order architecture core and an exemplary register renaming, out-of-order issue/execution architecture core to be included in a processor according to embodiments of the invention.

FIG. 9 is a block diagram illustrating both an exemplary in-order pipeline and an exemplary register renaming, out-of-order issue/execution pipeline according to embodiments of the invention. FIG. 10 is a block diagram illustrating both an exemplary embodiment of an in-order architecture core and an exemplary register renaming, out-of-order issue/execution architecture core to be included in a processor according to embodiments of the invention. The solid lined boxes in FIG. 9-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 10 shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 11B:
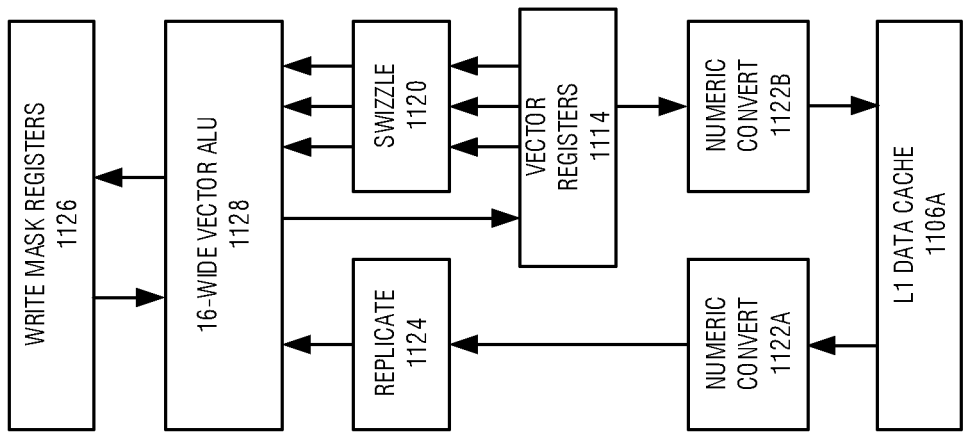
FIGS. 11A-B illustrate a block diagram of a more specific exemplary in-order core architecture, which core would be one of several logic blocks (including other cores of the same type and/or different types) in a chip.
Figure 11A:
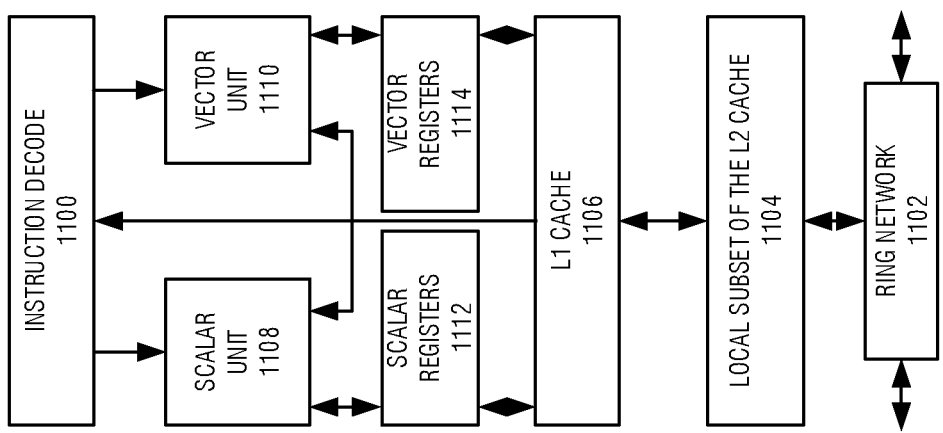

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to embodiments of the invention. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and may be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments of the invention. FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Figure 12:
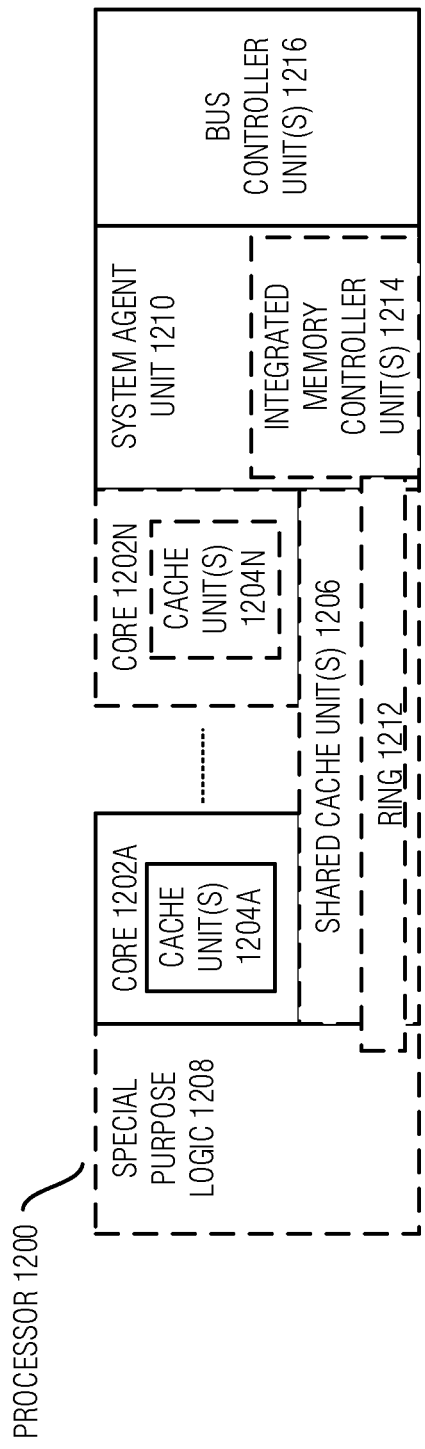
FIG. 12 is a block diagram of a processor that may have more than one core, may have an integrated memory controller, and may have integrated graphics according to embodiments of the invention.

FIG. 12 is a block diagram of a processor 1200 that may have more than one core, may have an integrated memory controller, and may have integrated graphics according to embodiments of the invention. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multi-threading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

FIGS. 13-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
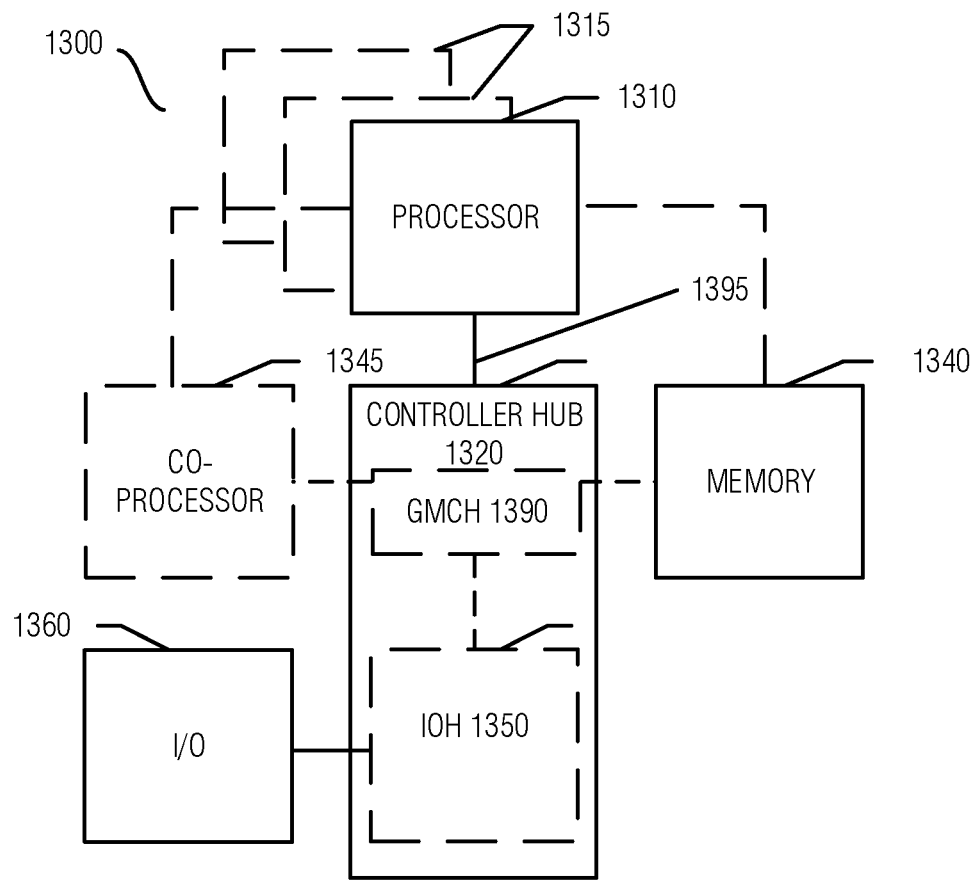
FIGS. 13-16 are block diagrams of exemplary computer architectures.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 is couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There may be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
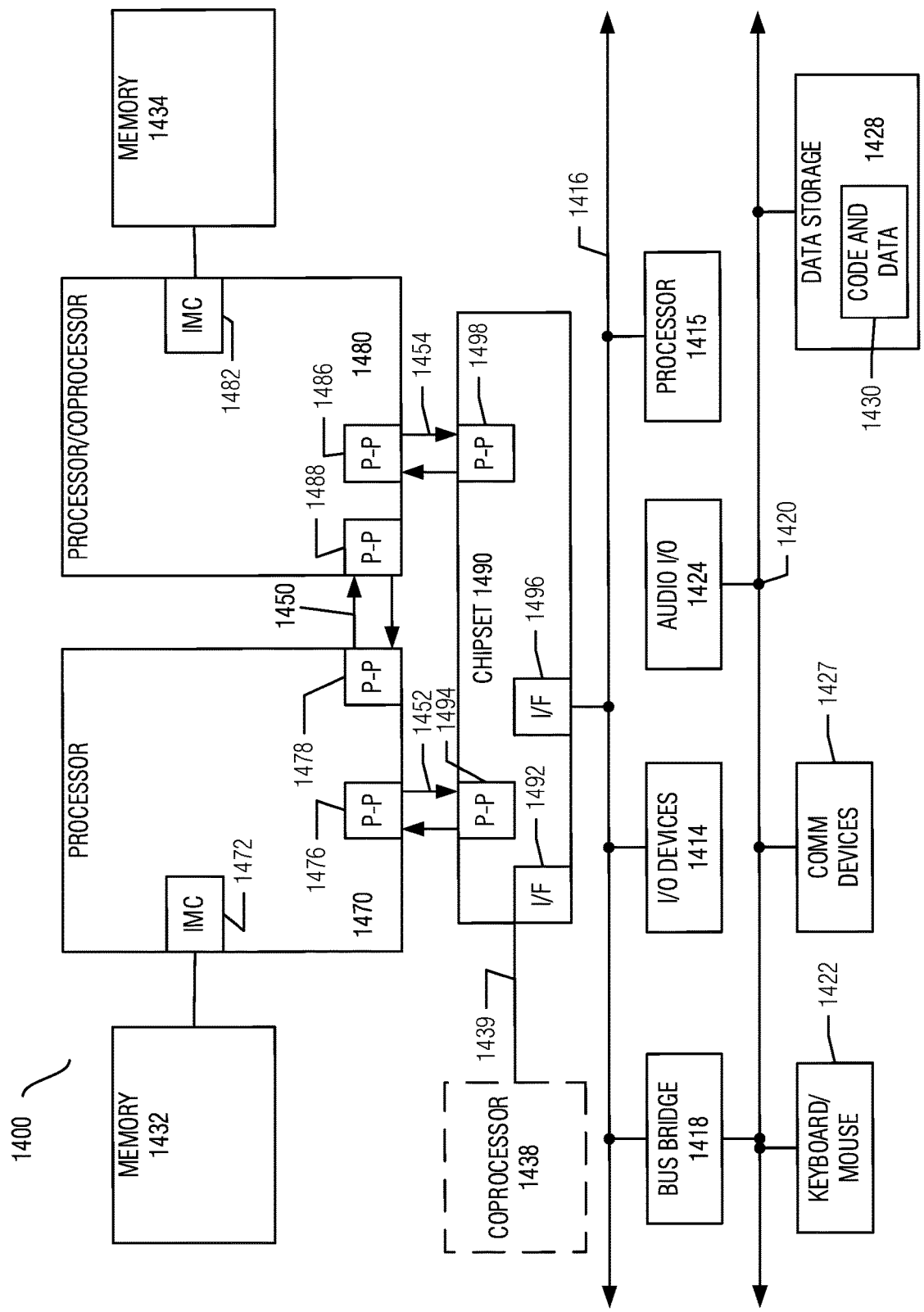

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the invention, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
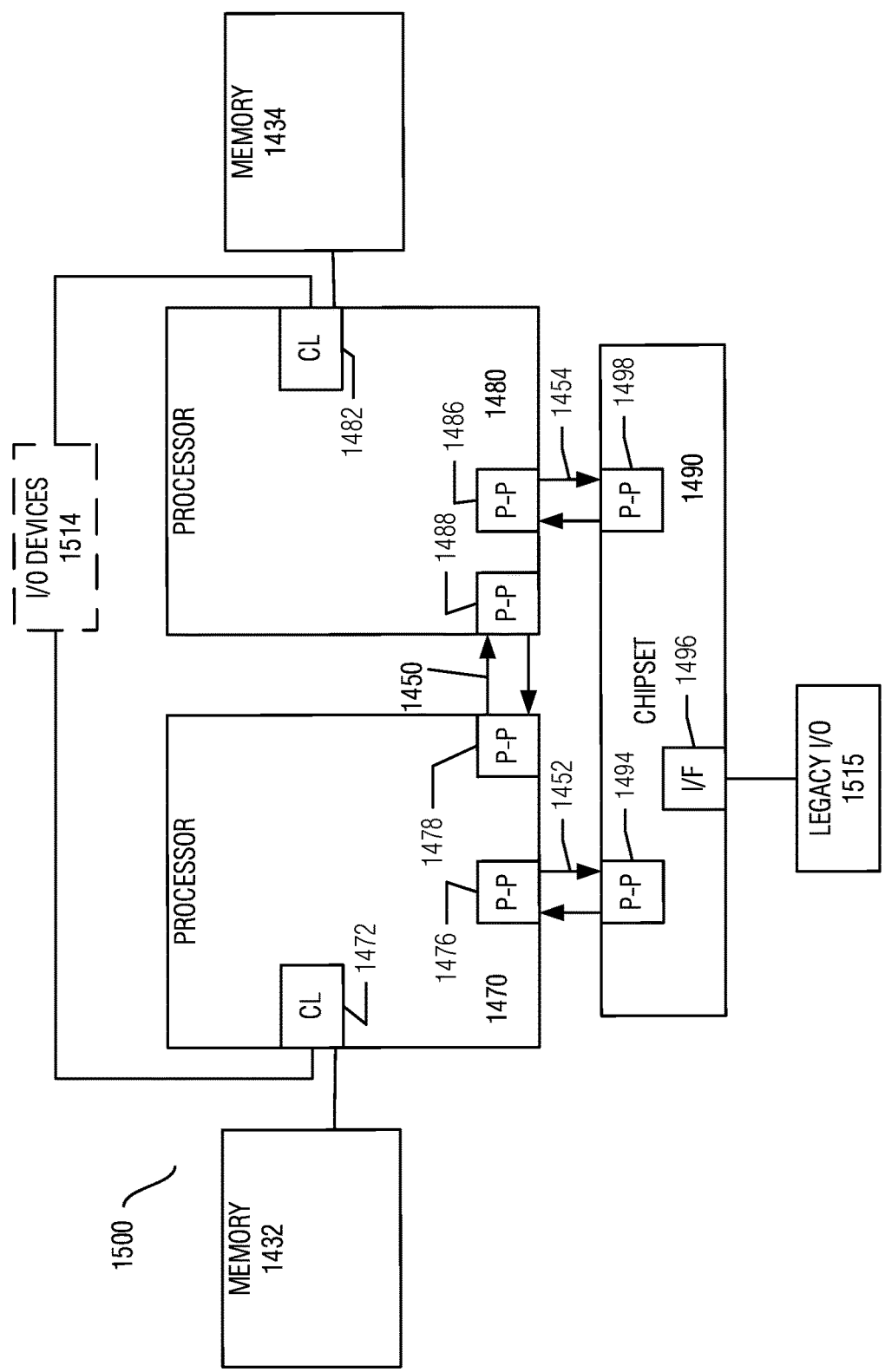

Referring now to FIG. 15, shown is a block diagram of a second more specific exemplary system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller units and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
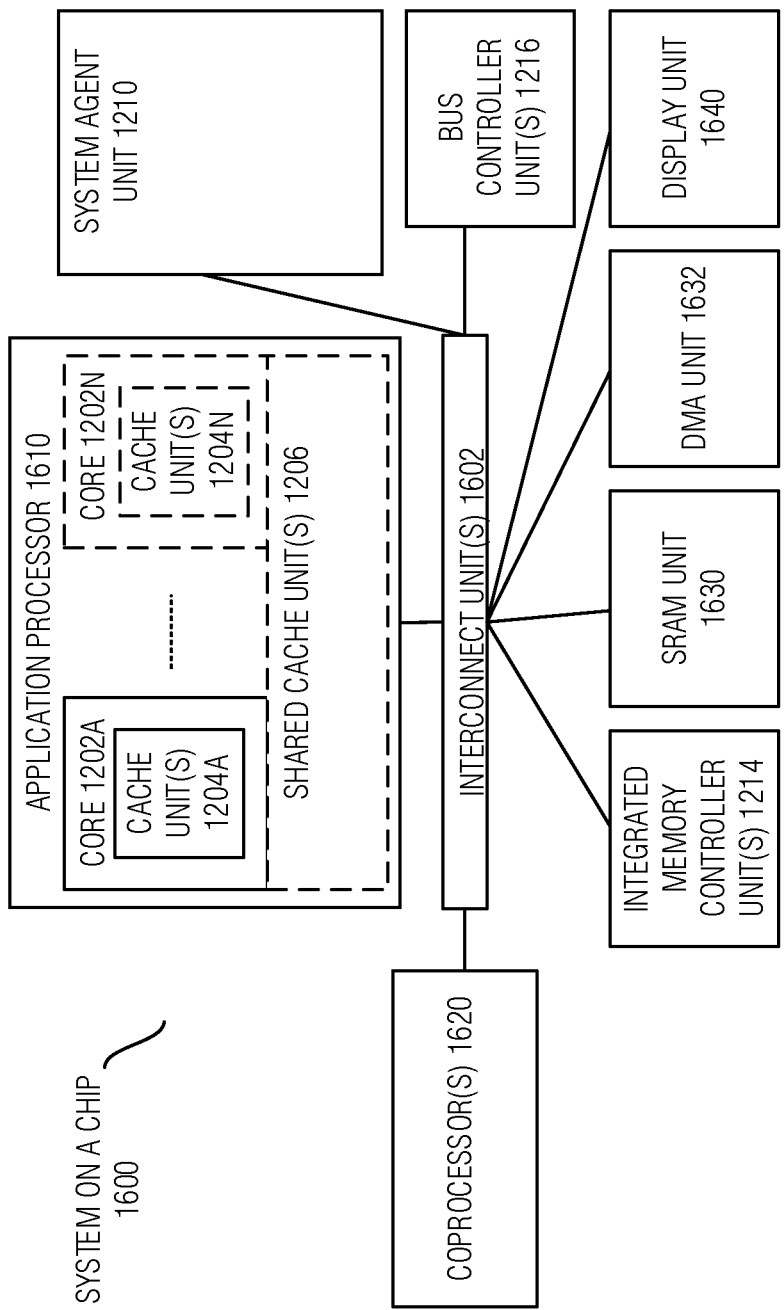

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 202A-N and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
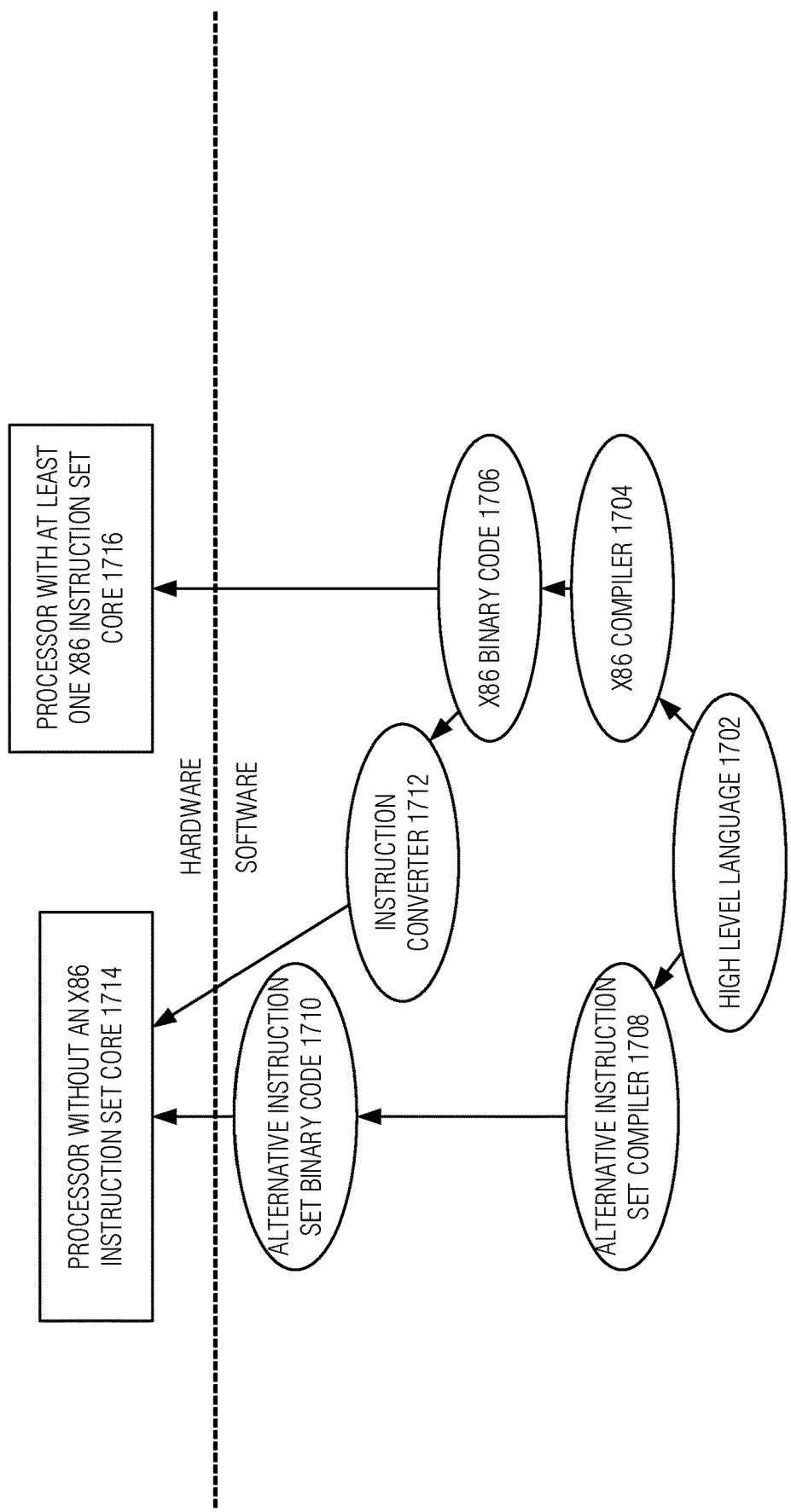
FIG. 17 is a block diagram contrasting the use of a software instruction converter to convert binary instructions in a source instruction set to binary instructions in a target instruction set according to embodiments of the invention.

FIG. 17 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that may perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that may, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

ADDITIONAL NOTES & EXAMPLES

Example 1 is a neural core for variable epoch spike train filtering, the neural core comprising: a spike trace storage; trace decay modeler circuitry to produce a spike trace in response to an epoch learning event using a count of received spikes in the spike trace storage; and processing circuitry to: receive multiple spikes at the neural core during an epoch to which the epoch learning event corresponds; increment the spike trace storage for each of the multiple spikes to produce the count of received spikes; and modify, in response to an occurrence of the epoch learning event, network parameters of the neural core using the spike trace.

In Example 2, the subject matter of Example 1 includes, wherein, to produce the spike trace using the count of received spikes, the trace decay modeler circuitry scales the count of received spikes by a constant.

In Example 3, the subject matter of Example 2 includes, wherein the constant is a minimum inter-spike interval.

In Example 4, the subject matter of Examples 2-3 includes, wherein, to produce the spike trace using the count of received spikes, the trace decay modeler circuitry multiplies the scaled count of received spikes by two raised to the power of SHIFT plus one, where SHIFT is a constant defined by a width of the spike trace storage minus a width of a maximal scaled count of received spikes.

In Example 5, the subject matter of Examples 2-4 includes, wherein, to produce the spike trace using the count of received spikes, the trace decay modeler circuitry applies a single exponential decay to a prior epoch trace value to obtain the spike trace.

In Example 6, the subject matter of Example 5 includes, wherein the single exponential decay is calculated by: $X[i]=expDecay(Tau, Tepoch, X[i-1]-Impulse)+Impulse$, wherein $X[i]$ is the spike trace, $X[i-1]$ is the prior epoch trace, Impulse is the scaled count of received spikes, Tepoch is a number of time steps in the epoch, and Tau is a constant.

In Example 7, the subject matter of Example 6 includes, wherein Tepoch is a power of two.

In Example 8, the subject matter of Examples 1-7 includes, wherein the processing circuitry is further to: receive a single spike during the second epoch; store a spike arrival since epoch in the spike trace storage; obtain a second epoch learning event for the second epoch; and modify the network parameters of the neural core using a second spike trace; and wherein the trace decay modeler circuitry is further to produce the second spike trace in response to the second epoch learning event using spike arrival since epoch in the spike trace storage.

In Example 9, the subject matter of Example 8 includes, wherein, to produce the second spike trace in response to the second epoch learning event using spike arrival since epoch, the trace decay modeler circuitry applies an exponential decay based on the spike arrival since epoch.

In Example 10, the subject matter of Example 9 includes, wherein the spike trace storage includes a bit that indicates whether a single spike or multiple spikes arrived during a given epoch, and wherein the exponential decay of the spike trace storage as either of count of received spikes or spike arrival since epoch is governed by the bit.

In Example 11, the subject matter of Examples 1-10 includes, wherein the epoch learning event is an end of the epoch.

In Example 12, the subject matter of Examples 1-11 includes, wherein the spike trace storage is a register of the neural core.

In Example 13, the subject matter of Examples 1-12 includes, wherein, to modify the network parameters of the neural core using the spike trace, the processing circuitry modifies a synaptic variable state as a function of the spike trace.

Example 14 is a system for variable epoch spike train filtering, the system comprising: multiple neural chips, each neural chips including multiple neural cores, a neural core of the multiple neural cores comprising: a spike trace storage; trace decay modeler circuitry to produce a spike trace in response to an epoch learning event using a count of received spikes in the spike trace storage; and processing circuitry to: receive multiple spikes at the neural core during an epoch to which the epoch learning event corresponds; increment the spike trace storage for each of the multiple spikes to produce the count of received spikes; and modify, in response to an occurrence of the epoch learning event, network parameters of the neural core using the spike trace; and an interconnect to provide communications from neural chips to each other and from neural chips to devices external to the system.

In Example 15, the subject matter of Example 14 includes, wherein, to produce the spike trace using the count of received spikes, the trace decay modeler circuitry scales the count of received spikes by a constant.

In Example 16, the subject matter of Example 15 includes, wherein the constant is a minimum inter-spike interval.

In Example 17, the subject matter of Examples 15-16 includes, wherein, to produce the spike trace using the count of received spikes, the trace decay modeler circuitry multiplies the scaled count of received spikes by two raised to the power of SHIFT plus one, where SHIFT is a constant defined by a width of the spike trace storage minus a width of a maximal scaled count of received spikes.

In Example 18, the subject matter of Examples 15-17 includes, wherein, to produce the spike trace using the count of received spikes, the trace decay modeler circuitry applies a single exponential decay to a prior epoch trace value to obtain the spike trace.

In Example 19, the subject matter of Example 18 includes, wherein the single exponential decay is calculated by: $X[i]=expDecay(Tau, Tepoch, X[i-14]-Impulse)+Impulse$, wherein $X[i]$ is the spike trace, $X[i-14]$ is the prior epoch trace, Impulse is the scaled count of received spikes, Tepoch is a number of time steps in the epoch, and Tau is a constant.

In Example 20, the subject matter of Example 19 includes, wherein Tepoch is a power of two.

In Example 21, the subject matter of Examples 14-20 includes, wherein the processing circuitry is further to: receive a single spike during the second epoch; store a spike arrival since epoch in the spike trace storage; obtain a second epoch learning event for the second epoch; and modify the network parameters of the neural core using a second spike trace; and wherein the trace decay modeler circuitry is further to produce the second spike trace in response to the second epoch learning event using spike arrival since epoch in the spike trace storage.

In Example 22, the subject matter of Example 21 includes, wherein, to produce the second spike trace in response to the second epoch learning event using spike arrival since epoch, the trace decay modeler circuitry applies an exponential decay based on the spike arrival since epoch.

In Example 23, the subject matter of Example 22 includes, wherein the spike trace storage includes a bit that indicates whether a single spike or multiple spikes arrived during a given epoch, and wherein the exponential decay of the spike trace storage as either of count of received spikes or spike arrival since epoch is governed by the bit.

In Example 24, the subject matter of Examples 14-23 includes, wherein the epoch learning event is an end of the epoch.

In Example 25, the subject matter of Examples 14-24 includes, wherein the spike trace storage is a register of the neural core.

In Example 26, the subject matter of Examples 14-25 includes, wherein, to modify the network parameters of the neural core using the spike trace, the processing circuitry modifies a synaptic variable state as a function of the spike trace.

In Example 27, the subject matter of Examples 14-26 includes, wherein the system is included in a sensor device, and wherein the interconnect connects the neural chips to a sensor.

In Example 28, the subject matter of Example 27 includes, wherein the sensor is at least one of a camera, a thermometer, a barometer, a location sensor, a humidity sensor, or a microphone.

In Example 29, the subject matter of Examples 27-28 includes, wherein the interconnect provides classification data from the neural cores to a consumer device.

In Example 30, the subject matter of Example 29 includes, wherein the consumer device is a network interface to communicate via a network to a remote machine.

Example 31 is a method for variable epoch spike train filtering, the method comprising: receiving multiple spikes at the neural core during the epoch; incrementing a value in a spike trace storage for each of the multiple spikes to produce a count of received spikes, the spike trace storage included in a neural core of neuromorphic hardware; producing a spike trace in response to an epoch learning event using the count of received spikes in the spike trace storage; and modifying network parameters of the neural core using the spike trace.

In Example 32, the subject matter of Example 31 includes, wherein producing the spike trace using the count of received spikes includes scaling the count of received spikes by a constant.

In Example 33, the subject matter of Example 32 includes, wherein the constant is a minimum inter-spike interval.

In Example 34, the subject matter of Examples 32-33 includes, wherein producing the spike trace using the count of received spikes includes multiplying the scaled count of received spikes by two raised to the power of SHIFT plus one, where SHIFT is a constant defined by a width of the spike trace storage minus a width of a maximal scaled count of received spikes.

In Example 35, the subject matter of Examples 32-34 includes, wherein producing the spike trace using the count of received spikes includes applying a single exponential decay to a prior epoch trace value to obtain the spike trace.

In Example 36, the subject matter of Example 35 includes, wherein the single exponential decay is calculated by: $X[i]=\text{expDecay}(\text{Tau}, \text{Tepoch}, X[i-31]-\text{Impulse})+\text{Impulse}$, wherein $X[i]$ is the spike trace, $X[i-31]$ is the prior epoch trace, Impulse is the scaled count of received spikes, Tepoch is a number of time steps in the epoch, and Tau is a constant.

In Example 37, the subject matter of Example 36 includes, wherein Tepoch is a power of two.

In Example 38, the subject matter of Examples 31-37 includes, receiving a single spike during a second epoch; storing a spike arrival since epoch in the spike trace storage; producing a second spike trace in response to a second epoch learning event using spike arrival since epoch in the spike trace storage; and modifying the network parameters of the neural core using the second spike trace.

In Example 39, the subject matter of Example 38 includes, wherein producing the second spike trace in response to the second epoch learning event using spike arrival since epoch includes applying an exponential decay based on the spike arrival since epoch.

In Example 40, the subject matter of Example 39 includes, wherein the spike trace storage includes a bit that indicates whether a single spike or multiple spikes arrived during a given epoch, and wherein the exponential decay of the spike trace storage as either of count of received spikes or spike arrival since epoch is governed by the bit.

In Example 41, the subject matter of Examples 31-40 includes, wherein the epoch learning event is an end of the epoch.

In Example 42, the subject matter of Examples 31-41 includes, wherein the spike trace storage is a register of the neural core.

In Example 43, the subject matter of Examples 31-42 includes, wherein modifying network parameters of the neural core using the spike trace includes modifying a synaptic variable state as a function of the spike trace.

Example 44 is at least one machine readable medium including instructions that, when executed by a machine, cause the machine to perform any method of Examples 31-43.

Example 45 is a system comprising means to perform any method of Examples 31-43.

Example 46 is at least one machine readable medium including instructions for variable epoch spike train filtering, the instructions, when executed by processing circuitry, configure the processing circuitry to perform operations comprising: receiving multiple spikes at the neural core during an epoch; incrementing a value in a spike trace storage for each of the multiple spikes to produce a count of received spikes, the spike trace storage included in a neural core of neuromorphic hardware; producing a spike trace in response to an epoch learning event using the count of received spikes in the spike trace storage; and modifying network parameters of the neural core using the spike trace.

In Example 47, the subject matter of Example 46 includes, wherein producing the spike trace using the count of received spikes includes scaling the count of received spikes by a constant.

In Example 48, the subject matter of Example 47 includes, wherein the constant is a minimum inter-spike interval.

In Example 49, the subject matter of Examples 47-48 includes, wherein producing the spike trace using the count of received spikes includes multiplying the scaled count of received spikes by two raised to the power of SHIFT plus one, where SHIFT is a constant defined by a width of the spike trace storage minus a width of a maximal scaled count of received spikes.

In Example 50, the subject matter of Examples 47-49 includes, wherein producing the spike trace using the count of received spikes includes applying a single exponential decay to a prior epoch trace value to obtain the spike trace.

In Example 51, the subject matter of Example 50 includes, wherein the single exponential decay is calculated by: X[i]=expDecay(Tau, Tepoch, X[i−46]−Impulse)+Impulse, wherein X[i] is the spike trace, X[i−46] is the prior epoch trace, Impulse is the scaled count of received spikes, Tepoch is a number of time steps in the epoch, and Tau is a constant.

In Example 52, the subject matter of Example 51 includes, wherein Tepoch is a power of two.

In Example 53, the subject matter of Examples 46-52 includes, wherein the operations comprise: receiving a single spike during a second epoch; storing a spike arrival since epoch in the spike trace storage; producing a second spike trace in response to a second epoch learning event using spike arrival since epoch in the spike trace storage; and modifying the network parameters of the neural core using the second spike trace.

In Example 54, the subject matter of Example 53 includes, wherein producing the second spike trace in response to the second epoch learning event using spike arrival since epoch includes applying an exponential decay based on the spike arrival since epoch.

In Example 55, the subject matter of Example 54 includes, wherein the spike trace storage includes a bit that indicates whether a single spike or multiple spikes arrived during a given epoch, and wherein the exponential decay of the spike trace storage as either of count of received spikes or spike arrival since epoch is governed by the bit.

In Example 56, the subject matter of Examples 46-55 includes, wherein the epoch learning event is an end of the epoch.

In Example 57, the subject matter of Examples 46-56 includes, wherein the spike trace storage is a register of the neural core.

In Example 58, the subject matter of Examples 46-57 includes, wherein modifying network parameters of the neural core using the spike trace includes modifying a synaptic variable state as a function of the spike trace.

Example 59 is a system for variable epoch spike train filtering, the system comprising: means for receiving multiple spikes at the neural core during an epoch; means for incrementing a value in a spike trace storage for each of the multiple spikes to produce a count of received spikes, the spike trace storage included in a neural core of neuromorphic hardware; means for producing a spike trace in response to an epoch learning event using the count of received spikes in the spike trace storage; and means for modifying network parameters of the neural core using the spike trace.

In Example 60, the subject matter of Example 59 includes, wherein the means for producing the spike trace using the count of received spikes include means for scaling the count of received spikes by a constant.

In Example 61, the subject matter of Example 60 includes, wherein the constant is a minimum inter-spike interval.

In Example 62, the subject matter of Examples 60-61 includes, wherein the means for producing the spike trace using the count of received spikes include means for multiplying the scaled count of received spikes by two raised to the power of SHIFT plus one, where SHIFT is a constant defined by a width of the spike trace storage minus a width of a maximal scaled count of received spikes.

In Example 63, the subject matter of Examples 60-62 includes, wherein the means for producing the spike trace using the count of received spikes include means for applying a single exponential decay to a prior epoch trace value to obtain the spike trace.

In Example 64, the subject matter of Example 63 includes, wherein the single exponential decay is calculated by: X[i]=expDecay(Tau, Tepoch, X[i−59]−Impulse)+Impulse, wherein X[i] is the spike trace, X[i−59] is the prior epoch trace, Impulse is the scaled count of received spikes, Tepoch is a number of time steps in the epoch, and Tau is a constant.

In Example 65, the subject matter of Example 64 includes, wherein Tepoch is a power of two.

In Example 66, the subject matter of Examples 59-65 includes, means for receiving a single spike during a second epoch; means for storing a spike arrival since epoch in the spike trace storage; means for producing a second spike trace in response to a second epoch learning event using spike arrival since epoch in the spike trace storage; and means for modifying the network parameters of the neural core using the second spike trace.

In Example 67, the subject matter of Example 66 includes, wherein the means for producing the second spike trace in response to the second epoch learning event using spike arrival since epoch include means for applying an exponential decay based on the spike arrival since epoch.

In Example 68, the subject matter of Example 67 includes, wherein the spike trace storage includes a bit that indicates whether a single spike or multiple spikes arrived during a given epoch, and wherein the exponential decay of the spike trace storage as either of count of received spikes or spike arrival since epoch is governed by the bit.

In Example 69, the subject matter of Examples 59-68 includes, wherein the epoch learning event is an end of the epoch.

In Example 70, the subject matter of Examples 59-69 includes, wherein the spike trace storage is a register of the neural core.

In Example 71, the subject matter of Examples 59-70 includes, wherein the means for modifying network parameters of the neural core using the spike trace include means for modifying a synaptic variable state as a function of the spike trace.

Example 72 is at least one machine-readable medium including instructions that, when executed by processing circuitry, cause the processing circuitry to perform operations to implement of any of Examples 1-71.

Example 73 is an apparatus comprising means to implement of any of Examples 1-71.

Example 74 is a system to implement of any of Examples 1-71.

Example 75 is a method to implement of any of Examples 1-71.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The invention claimed is:

1. A system for variable epoch spike train filtering, the system comprising:
multiple neural chips, each neural chip including multiple neural cores, a neural core of the multiple neural cores comprising:
a spike trace storage;
trace decay modeler circuitry to produce a spike trace in response to an epoch learning event using a count of received spikes in the spike trace storage; and
processing circuitry to:
receive multiple spikes at the neural core during an epoch to which the epoch learning event corresponds;
increment the spike trace storage for each of the multiple spikes to produce the count of received spikes; and
modify, in response to an occurrence of the epoch learning event, network parameters of the neural core using the spike trace; and
an interconnect to provide communications from neural chips to each other and from neural chips to devices external to the system.

2. The system of claim 1, wherein, to produce the spike trace using the count of received spikes, the trace decay modeler circuitry scales the count of received spikes by a constant.

3. The system of claim 2, wherein, to produce the spike trace using the count of received spikes, the trace decay modeler circuitry applies a single exponential decay to a prior epoch trace value to obtain the spike trace.

4. The system of claim 3, wherein the single exponential decay is calculated by:
$X[i]=\text{expDecay}(\text{Tau}, \text{Tepoch}, X[i-1]-\text{Impulse})+\text{Impulse}$, wherein $X[i]$ is the spike trace, $X[i-1]$ is the prior epoch trace, Impulse is the scaled count of received spikes, Tepoch is a number of time steps in the epoch, and Tau is a constant.

5. The system of claim 1, wherein, to modify the network parameters of the neural core using the spike trace, the processing circuitry modifies a synaptic variable state as a function of the spike trace.

6. The system of claim 1, wherein the system is included in a sensor device, and wherein the interconnect connects the neural chips to a sensor.

7. The system of claim 6, wherein the sensor is at least one of a camera, a thermometer, a barometer, a location sensor, a humidity sensor, or a microphone.

8. The method of claim 6, wherein the interconnect provides classification data from the neural cores to a consumer device.

9. The method of claim 8, wherein the consumer device is a network interface to communicate via a network to a remote machine.

10. A neural core for variable epoch spike train filtering, the neural core comprising:
a spike trace storage;
trace decay modeler circuitry to produce a spike trace in response to an epoch learning event using a count of received spikes in the spike trace storage, wherein, to produce the spike trace using the count of received spikes, the trace decay modeler circuitry scales the count of received spikes by a constant; and
processing circuitry to:
receive multiple spikes at the neural core during an epoch to which the epoch learning event corresponds;
increment the spike trace storage for each of the multiple spikes to produce the count of received spikes; and
modify, in response to an occurrence of the epoch learning event, network parameters of the neural core using the spike trace.

11. The neural core of claim 10, wherein, to produce the spike trace using the count of received spikes, the trace decay modeler circuitry multiplies the scaled count of received spikes by two raised to the power of SHIFT plus one, where SHIFT is a constant defined by a width of the spike trace storage minus a width of a maximal scaled count of received spikes.

12. The neural core of claim 10, wherein, to produce the spike trace using the count of received spikes, the trace decay modeler circuitry applies a single exponential decay to a prior epoch trace value to obtain the spike trace.

13. The neural core of claim 12, wherein e single exponential decay is calculated by:

X[i]=expDecay(Tau, Tepoch, X[i−10]—Impulse)+Impulse, wherein X[1] is the spike trace, X[i−10] is the prior epoch trace, Impulse is the scaled count of received spikes, Tepoch is a number of time steps in the epoch, and Tau is a constant.

14. The neural core of claim 10, wherein the processing circuitry is further to:
receive a single spike during the second epoch;
store a spike arrival since epoch in the spike trace storage;
obtain a second epoch learning event for the second epoch; and
modify the network parameters of the neural core using a second spike trace; and
wherein the trace decay modeler circuitry is further to produce the second spike trace in response to the second epoch learning event using spike arrival since epoch in the spike trace storage.

15. The neural core of claim 14, wherein, to produce the second spike trace in response to the second epoch learning event using spike arrival since epoch, the trace decay modeler circuitry applies an exponential decay based on the spike arrival since epoch.

16. The neural core of claim 10, wherein, to modify the network parameters of the neural core using the spike trace, the processing circuitry modifies a synaptic variable state as a function of the spike trace.

17. The system of claim 10, wherein the constant is a minimum inter-spike interval.

18. At least one non-transitory machine readable medium including instructions for variable epoch spike train filtering, the instructions, when executed by processing circuitry, configure the processing circuitry to perform operations comprising:
receiving multiple spikes at the neural core during an epoch;
incrementing a value in a spike trace storage for each of the multiple spikes to produce a count of received spikes, the spike trace storage included in a neural core of neuromorphic hardware;
producing a spike trace in response to an epoch learning event, using the count of received spikes in the spike trace storage, wherein producing the spike trace using the count of received spikes includes scaling the count of received spikes by a constant; and
modifying network parameters of the neural core using the spike trace.

19. The at least one machine readable medium of claim 18, wherein producing the spike trace using the count of received spikes includes multiplying the scaled count of received spikes by two raised to the power of SHIFT plus one, where SHIFT is a constant defined by a width of the spike trace storage minus a width of a maximal scaled count of received spikes.

20. The at least one machine readable medium of claim 18, wherein producing the spike trace using the count of received spikes includes applying a single exponential decay to a prior epoch trace value to obtain the spike trace.

21. The at least one machine readable medium of claim 20, wherein the sing exponential decay is calculated by:

X[i]=expDecay(Tau, Tepoch, X[i−18[−Impulse)+Impulse, wherein X[i] is the spike trace, X[i−18] is the prior epoch trace, Impulse is the scaled count of received spikes, Tepoch is a number of time steps in the epoch, and Tau is a constant.

22. The at least one machine readable medium of claim 18, wherein the operations comprise:
receiving a single spike during a second epoch;
storing a spike arrival since epoch in the spike trace storage;
producing a second spike trace in response to a second epoch learning event using spike arrival since epoch in the spike trace storage; and
modifying the network parameters of the neural core using the second spike trace.

23. The at least one machine readable medium of claim 22, wherein producing the second spike trace in response to the second epoch learning event using spike arrival since epoch includes applying an exponential decay based on the spike arrival since epoch.

24. The at least one machine readable medium of claim 18, wherein modifying network parameters of the neural core using the spike trace includes modifying a synaptic variable state as a function of the spike trace.

25. The at least one machine readable medium of claim 18, wherein the constant is a minimum inter-spike interval.

* * * * *

UNITED STATES PATENT AND TRADEMARK OFFICE
CERTIFICATE OF CORRECTION

PATENT NO. : 10,956,811 B2
APPLICATION NO. : 15/664614
DATED : March 23, 2021
INVENTOR(S) : Davies et al.

It is certified that error appears in the above-identified patent and that said Letters Patent is hereby corrected as shown below:

In the Claims

In Column 32, Line 39, in Claim 8, delete "method" and insert --system-- therefor In Column 32, Line 42, in Claim 9, delete "method" and insert --system-- therefor In Column 33, Line 8, in Claim 13, delete "e" and insert --the-- therefor In Column 33, Line 11, in Claim 13, delete "X[1]" and insert --X[i]-- therefor In Column 33, Line 36, in Claim 17, delete "system" and insert --neural core-- therefor In Column 34, Line 2, in Claim 18, delete "event," and insert --event-- therefor In Column 34, Line 20, in Claim 21, delete "sing" and insert --single-- therefor In Column 34, Line 21, in Claim 21, delete "X[i-18[-Impulse)" and insert --X[i-18]-Impulse)-- therefor Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*